United States Patent
Kendall et al.

(10) Patent No.: US 10,068,258 B2
(45) Date of Patent: Sep. 4, 2018

(54) SPONSORED STORIES AND NEWS STORIES WITHIN A NEWSFEED OF A SOCIAL NETWORKING SYSTEM

(75) Inventors: Timothy Kendall, Palo Alto, CA (US); Matthew R. Cohler, Portola Valley, CA (US); Mark E. Zuckerberg, Palo Alto, CA (US); Yun-Fang Juan, San Jose, CA (US); Robert Kang-Xing Jin, Palo Alto, CA (US); Justin M. Rosenstein, Palo Alto, CA (US); Andrew G. Bosworth, Palo Alto, CA (US); Yishan Wong, Mountain View, CA (US); Adam D'Angelo, Mountain View, CA (US); Chamath M. Palihapitiya, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 506 days.

(21) Appl. No.: 13/447,102

(22) Filed: Apr. 13, 2012

(65) Prior Publication Data

US 2012/0203847 A1    Aug. 9, 2012

Related U.S. Application Data

(63) Continuation of application No. 12/193,702, filed on Aug. 18, 2008.

(Continued)

(51) Int. Cl.
*G06Q 30/00* (2012.01)
*G06Q 99/00* (2006.01)
(Continued)

(52) U.S. Cl.
CPC ........ *G06Q 30/0269* (2013.01); *G06Q 30/02* (2013.01); *G06Q 30/0215* (2013.01);
(Continued)

(58) Field of Classification Search
None
See application file for complete search history.

(56) References Cited

U.S. PATENT DOCUMENTS 5,987,440 A * 11/1999 O'Neil ................... G06Q 10/10
                                                          705/39
6,134,532 A * 10/2000 Lazarus ............. G06F 17/30867
                                                          705/1.1
(Continued)

FOREIGN PATENT DOCUMENTS

| CA | 2 672 735 | 6/2008 |
|---|---|---|
| CN | 101124598 A | 2/2008 |

(Continued)

OTHER PUBLICATIONS

Canadian Intellectual Property Office, Requisition by the Examiner, Canadian Patent Application No. 2,703,851, Aug. 6, 2012, 3 Pages.

(Continued)

*Primary Examiner* — Matthew T Sittner
(74) *Attorney, Agent, or Firm* — Fenwick & West LLP

(57) ABSTRACT

A social networking system generates socially-relevant stories for a user based on actions taken by other users to whom the user is connected. The social networking system may receive a request for a sponsored story for a viewing user and may select information about one or more actions performed by one or more users to whom the viewing user is connected to identify one of a plurality of candidate information for a sponsored story based on one or more criteria (e.g., affinity of the viewing user for the candidates, expected value for the candidates, etc.). The social networking system may also generate the sponsored story and generate a feed comprising the sponsored story and news stories (e.g., non-sponsored stories) about one or more users of the social networking system with whom the viewing user (Continued)

US 10,068,258 B2

Page 2 is connected. This feed may be provided for display to the viewing user.

26 Claims, 6 Drawing Sheets

Related U.S. Application Data

(60) Provisional application No. 60/985,631, filed on Nov. 5, 2007.

(51) Int. Cl.
*G06Q 30/02* (2012.01)
*H04L 12/18* (2006.01)
*H04W 4/20* (2018.01)
*H04W 4/02* (2018.01)
*H04L 29/08* (2006.01)

(52) U.S. Cl.
CPC ..... *G06Q 30/0254* (2013.01); *G06Q 30/0255* (2013.01); *G06Q 30/0275* (2013.01); *H04L 12/1859* (2013.01); *H04W 4/20* (2013.01); *H04L 67/18* (2013.01); *H04L 67/22* (2013.01); *H04L 67/306* (2013.01); *H04W 4/02* (2013.01)

(56) References Cited

U.S. PATENT DOCUMENTS

| | | | |
|---|---|---|---|
| 6,691,155 B2 * | 2/2004 | Gottfried | G06Q 30/02 709/204 |
| 7,523,478 B2 | 4/2009 | Blackketter et al. | |
| 7,752,552 B2 | 7/2010 | Pennington et al. | |
| 7,818,392 B1 | 10/2010 | Martino et al. | |
| 7,844,604 B2 | 11/2010 | Baio et al. | |
| 7,853,622 B1 | 12/2010 | Baluja et al. | |
| 7,958,005 B2 | 6/2011 | Dangaltchev | |
| 7,958,453 B1 | 6/2011 | Taing | |
| 8,161,083 B1 | 4/2012 | Wood et al. | |
| 8,166,028 B1 | 4/2012 | Reynar et al. | |
| 8,166,069 B2 | 4/2012 | Sample et al. | |
| 8,676,894 B2 | 3/2014 | Schoen et al. | |
| 8,892,650 B2 | 11/2014 | Li et al. | |
| 9,123,079 B2 | 9/2015 | Zigoris et al. | |
| 9,135,631 B2 | 9/2015 | Mitchell et al. | |
| 2002/0029186 A1 * | 3/2002 | Roth | G06Q 30/02 705/37 |
| 2002/0070961 A1 | 6/2002 | Xu et al. | |
| 2002/0077872 A1 * | 6/2002 | Lancos | G06Q 10/02 705/5 |
| 2002/0087352 A1 * | 7/2002 | Armstrong | G06Q 30/02 705/1.1 |
| 2002/0161838 A1 | 10/2002 | Pickover et al. | |
| 2002/0184088 A1 * | 12/2002 | Rosenberg | G06Q 30/00 705/14.51 |
| 2003/0046161 A1 * | 3/2003 | Kamangar | G06Q 30/02 705/14.6 |
| 2003/0093798 A1 | 5/2003 | Rogerson | |
| 2003/0137531 A1 | 7/2003 | Katinsky et al. | |
| 2003/0145042 A1 | 7/2003 | Berry et al. | |
| 2003/0149580 A1 * | 8/2003 | Moores | G06F 17/30873 705/319 |
| 2003/0163372 A1 | 8/2003 | Kolsy | |
| 2003/0187739 A1 | 10/2003 | Powers | |
| 2004/0015397 A1 | 1/2004 | Barry et al. | |
| 2004/0044571 A1 | 3/2004 | Bronnimann et al. | |
| 2004/0193488 A1 | 9/2004 | Khoo et al. | |
| 2004/0193691 A1 * | 9/2004 | Chang | G06Q 10/107 709/206 |
| 2004/0210565 A1 | 10/2004 | Lu et al. | |
| 2004/0249709 A1 | 12/2004 | Donovan et al. | |
| 2005/0065806 A1 * | 3/2005 | Harik | G06Q 30/02 705/1.1 |
| 2005/0096980 A1 | 5/2005 | Koningstein | |
| 2005/0097204 A1 | 5/2005 | Horowitz et al. | |
| 2005/0131992 A1 | 6/2005 | Goldstein et al. | |
| 2005/0137958 A1 | 6/2005 | Huber et al. | |
| 2005/0144065 A1 | 6/2005 | Calabria et al. | |
| 2005/0149397 A1 * | 7/2005 | Morgenstern | G06Q 30/02 705/14.52 |
| 2005/0171955 A1 * | 8/2005 | Hull | G06Q 50/01 |
| 2005/0183133 A1 | 8/2005 | Kelly | |
| 2005/0197894 A1 | 9/2005 | Fairbanks et al. | |
| 2005/0216300 A1 | 9/2005 | Appelman et al. | |
| 2005/0246651 A1 | 11/2005 | Krzanowski | |
| 2005/0289131 A1 | 12/2005 | Aenlle et al. | |
| 2006/0026063 A1 | 2/2006 | Collins | |
| 2006/0041509 A1 | 2/2006 | Koerber | |
| 2006/0042483 A1 * | 3/2006 | Work | G06Q 10/00 101/91 |
| 2006/0059147 A1 | 3/2006 | Weiss et al. | |
| 2006/0064346 A1 * | 3/2006 | Steenstra | G06Q 30/0261 705/14.64 |
| 2006/0085408 A1 | 4/2006 | Morsa | |
| 2006/0101341 A1 | 5/2006 | Kelly et al. | |
| 2006/0184579 A1 | 8/2006 | Mills et al. | |
| 2006/0190281 A1 * | 8/2006 | Kott | G06Q 30/02 709/226 |
| 2006/0215988 A1 | 9/2006 | Tol et al. | |
| 2006/0230061 A1 | 10/2006 | Sample et al. | |
| 2006/0248573 A1 * | 11/2006 | Pannu | G06F 21/62 726/1 |
| 2006/0253584 A1 | 11/2006 | Dixon et al. | |
| 2006/0265283 A1 | 11/2006 | Gorodyansky | |
| 2006/0271953 A1 | 11/2006 | Jacoby et al. | |
| 2006/0271961 A1 | 11/2006 | Jacoby et al. | |
| 2006/0271997 A1 | 11/2006 | Jacoby et al. | |
| 2006/0277102 A1 | 12/2006 | Agliozzo | |
| 2007/0006277 A1 | 1/2007 | Mills et al. | |
| 2007/0016553 A1 * | 1/2007 | Dumais | H04L 51/34 |
| 2007/0027773 A1 | 2/2007 | Lee | |
| 2007/0038508 A1 | 2/2007 | Jain et al. | |
| 2007/0043766 A1 | 2/2007 | Nicholas et al. | |
| 2007/0073581 A1 | 3/2007 | Kempe et al. | |
| 2007/0078718 A1 | 4/2007 | Gorodyansky | |
| 2007/0101368 A1 | 5/2007 | Jacoby et al. | |
| 2007/0106627 A1 * | 5/2007 | Srivastava | G06Q 10/10 706/20 |
| 2007/0121843 A1 * | 5/2007 | Atazky | H04L 51/32 379/114.13 |
| 2007/0150537 A1 * | 6/2007 | Graham | G06Q 30/02 709/203 |
| 2007/0150603 A1 | 6/2007 | Crull et al. | |
| 2007/0157108 A1 | 7/2007 | Bishop | |
| 2007/0179792 A1 * | 8/2007 | Kramer | G06Q 30/02 705/1.1 |
| 2007/0204308 A1 | 8/2007 | Nicholas et al. | |
| 2007/0220575 A1 | 9/2007 | Cooper et al. | |
| 2007/0239517 A1 * | 10/2007 | Chung | G06Q 30/02 705/14.53 |
| 2007/0239535 A1 * | 10/2007 | Koran | G06Q 30/02 705/14.25 |
| 2007/0245399 A1 | 10/2007 | Espelien | |
| 2007/0252004 A1 | 11/2007 | Shiraki et al. | |
| 2007/0258656 A1 | 11/2007 | Aarabi | |
| 2007/0260520 A1 * | 11/2007 | Jha | G06Q 30/02 705/14.44 |
| 2007/0265090 A1 | 11/2007 | Barsness et al. | |
| 2007/0266097 A1 | 11/2007 | Harik et al. | |
| 2007/0299857 A1 | 12/2007 | Gworzdz et al. | |
| 2007/0300064 A1 | 12/2007 | Isaacs et al. | |
| 2008/0004959 A1 | 1/2008 | Tunguz-Zawislak et al. | |
| 2008/0005282 A1 | 1/2008 | Gaedcke | |
| 2008/0010144 A1 * | 1/2008 | Chatwin | G06Q 30/02 705/14.45 |
| 2008/0021729 A1 * | 1/2008 | Calabria | G06Q 10/10 705/319 |
| 2008/0033810 A1 | 2/2008 | Chu | |
| 2008/0040475 A1 | 2/2008 | Bosworth et al. | |
| 2008/0040673 A1 | 2/2008 | Zuckerberg et al. | |
| 2008/0059300 A1 | 3/2008 | Hamoui | |

(56) References Cited

U.S. PATENT DOCUMENTS

| | | | |
|---|---|---|---|
| 2008/0059308 A1 | 3/2008 | Gerken | |
| 2008/0065405 A1 | 3/2008 | Adelman et al. | |
| 2008/0065486 A1 | 3/2008 | Vincent et al. | |
| 2008/0070209 A1 | 3/2008 | Zhuang et al. | |
| 2008/0077595 A1 | 3/2008 | Leebow | |
| 2008/0082413 A1 | 4/2008 | Madhavan | |
| 2008/0082414 A1 | 4/2008 | Madhavan | |
| 2008/0086319 A1* | 4/2008 | Berger | G06Q 50/01 705/319 |
| 2008/0086379 A1* | 4/2008 | Dion | G06F 3/04842 705/14.1 |
| 2008/0091684 A1 | 4/2008 | Ellis et al. | |
| 2008/0097988 A1 | 4/2008 | Broder et al. | |
| 2008/0103913 A1 | 5/2008 | Leach et al. | |
| 2008/0104225 A1* | 5/2008 | Zhang | H04L 67/36 709/224 |
| 2008/0109285 A1* | 5/2008 | Reuther | G06F 17/30864 705/7.11 |
| 2008/0120183 A1 | 5/2008 | Park | |
| 2008/0126476 A1 | 5/2008 | Nicholas et al. | |
| 2008/0126949 A1 | 5/2008 | Sharma | |
| 2008/0133364 A1 | 6/2008 | Ullah | |
| 2008/0133495 A1* | 6/2008 | Fischer | G06F 17/30864 |
| 2008/0133756 A1 | 6/2008 | Taylor | |
| 2008/0134054 A1 | 6/2008 | Clark et al. | |
| 2008/0140506 A1* | 6/2008 | Christianson | G06Q 30/02 705/14.44 |
| 2008/0147498 A1 | 6/2008 | Chao et al. | |
| 2008/0147659 A1 | 6/2008 | Chen et al. | |
| 2008/0162260 A1* | 7/2008 | Rohan | G06Q 30/02 705/14.4 |
| 2008/0172344 A1 | 7/2008 | Eager et al. | |
| 2008/0177708 A1 | 7/2008 | Ayyar et al. | |
| 2008/0189169 A1* | 8/2008 | Turpin | G06Q 30/02 705/7.33 |
| 2008/0195428 A1 | 8/2008 | O'Sullivan | |
| 2008/0215581 A1 | 9/2008 | Messing et al. | |
| 2008/0215675 A1 | 9/2008 | Kaminitz et al. | |
| 2008/0228537 A1* | 9/2008 | Monfried | G06Q 30/02 705/14.53 |
| 2008/0250450 A1* | 10/2008 | Larner | G06Q 30/0256 725/34 |
| 2008/0267443 A1 | 10/2008 | Aarabi | |
| 2008/0270615 A1 | 10/2008 | Centola et al. | |
| 2008/0275899 A1* | 11/2008 | Baluja | G06Q 30/02 |
| 2008/0276183 A1 | 11/2008 | Siegrist et al. | |
| 2008/0281622 A1* | 11/2008 | Hoal | G06Q 30/02 705/319 |
| 2008/0294624 A1* | 11/2008 | Kanigsberg | G06F 17/30867 |
| 2008/0300980 A1 | 12/2008 | Benjamin et al. | |
| 2008/0301240 A1 | 12/2008 | Svendsen | |
| 2008/0301304 A1 | 12/2008 | Chitsaz et al. | |
| 2008/0313011 A1 | 12/2008 | Rose et al. | |
| 2008/0313206 A1 | 12/2008 | Kordun et al. | |
| 2009/0006188 A1 | 1/2009 | Guo et al. | |
| 2009/0006206 A1* | 1/2009 | Groe | G06Q 30/02 705/14.44 |
| 2009/0006469 A1 | 1/2009 | Jain et al. | |
| 2009/0018915 A1 | 1/2009 | Fisse | |
| 2009/0037255 A1* | 2/2009 | Chiu | G06Q 30/0256 705/14.54 |
| 2009/0037257 A1* | 2/2009 | Stuckey | G06Q 30/02 705/7.32 |
| 2009/0037517 A1 | 2/2009 | Frei | |
| 2009/0043648 A1 | 2/2009 | Mahdian et al. | |
| 2009/0055257 A1 | 2/2009 | Chien et al. | |
| 2009/0055263 A1* | 2/2009 | Okubo | G06Q 30/02 705/14.69 |
| 2009/0055285 A1 | 2/2009 | Law et al. | |
| 2009/0063284 A1* | 3/2009 | Turpin | G06Q 30/02 705/14.61 |
| 2009/0063467 A1 | 3/2009 | Abhyanker | |
| 2009/0063613 A1 | 3/2009 | Chijiiwa et al. | |
| 2009/0064183 A1 | 3/2009 | Chijiiwa et al. | |
| 2009/0070219 A1* | 3/2009 | D'Angelo et al. | G06Q 10/10 705/14.56 |
| 2009/0070334 A1* | 3/2009 | Callahan | G06F 21/604 |
| 2009/0070684 A1 | 3/2009 | Aldrich et al. | |
| 2009/0083134 A1* | 3/2009 | Burckart | G06Q 30/02 705/14.25 |
| 2009/0099909 A1 | 4/2009 | Phan | |
| 2009/0106040 A1* | 4/2009 | Jones | G06Q 30/02 705/319 |
| 2009/0106085 A1* | 4/2009 | Raimbeault | G06Q 20/208 705/14.44 |
| 2009/0106113 A1 | 4/2009 | Arora et al. | |
| 2009/0106447 A1 | 4/2009 | Lection | |
| 2009/0109978 A1 | 4/2009 | Zhu et al. | |
| 2009/0112701 A1* | 4/2009 | Turpin | G06Q 30/02 705/7.33 |
| 2009/0113480 A1* | 4/2009 | Allard | H04N 7/16 725/46 |
| 2009/0119167 A1* | 5/2009 | Kendall | G06Q 30/02 705/14.17 |
| 2009/0171748 A1 | 7/2009 | Aven et al. | |
| 2009/0182589 A1* | 7/2009 | Kendall | G06Q 10/02 705/5 |
| 2009/0187486 A1* | 7/2009 | Lefenfeld | G06Q 30/02 705/14.73 |
| 2009/0271247 A1 | 10/2009 | Karelin et al. | |
| 2009/0292656 A1 | 11/2009 | Raman et al. | |
| 2010/0010822 A1* | 1/2010 | Bal | G06Q 30/02 705/1.1 |
| 2010/0023871 A1 | 1/2010 | Bederson et al. | |
| 2010/0042931 A1 | 2/2010 | Dixon et al. | |
| 2010/0049608 A1* | 2/2010 | Grossman | G06Q 30/02 705/14.55 |
| 2010/0050090 A1 | 2/2010 | Leebow | |
| 2010/0057536 A1 | 3/2010 | Stefik et al. | |
| 2010/0063892 A1* | 3/2010 | Keronen | G06Q 30/04 705/26.1 |
| 2010/0070335 A1 | 3/2010 | Parekh et al. | |
| 2010/0124911 A1 | 5/2010 | Leeder | |
| 2010/0132049 A1 | 5/2010 | Vernal et al. | |
| 2010/0153212 A1* | 6/2010 | Stoll | G06Q 30/02 705/14.52 |
| 2010/0169363 A1 | 7/2010 | Gaedcke | |
| 2010/0174593 A1 | 7/2010 | Cao et al. | |
| 2010/0174726 A1* | 7/2010 | Nance | G06F 17/30699 707/750 |
| 2010/0180029 A1 | 7/2010 | Fourman | |
| 2010/0185513 A1* | 7/2010 | Anderson | G06Q 30/02 705/14.49 |
| 2010/0201614 A1 | 8/2010 | Cohen | |
| 2010/0217645 A1 | 8/2010 | Jin et al. | |
| 2010/0223119 A1 | 9/2010 | Klish | |
| 2010/0228582 A1 | 9/2010 | King et al. | |
| 2010/0228614 A1 | 9/2010 | Zhang et al. | |
| 2010/0228617 A1 | 9/2010 | Ransom et al. | |
| 2010/0293054 A1 | 11/2010 | Lieberman | |
| 2010/0293221 A1 | 11/2010 | Sidman et al. | |
| 2010/0332330 A1 | 12/2010 | Goel et al. | |
| 2011/0010448 A1 | 1/2011 | Gill et al. | |
| 2011/0022621 A1* | 1/2011 | Luo | G06Q 30/02 707/769 |
| 2011/0029388 A1* | 2/2011 | Kendall | G06Q 30/02 705/14.66 |
| 2011/0040586 A1 | 2/2011 | Murray et al. | |
| 2011/0040629 A1* | 2/2011 | Chiu | G06Q 30/0256 705/14.66 |
| 2011/0041168 A1 | 2/2011 | Murray et al. | |
| 2011/0078228 A1* | 3/2011 | Bristol | H04L 51/04 709/202 |
| 2011/0093336 A1* | 4/2011 | Calabria | G06Q 10/10 705/14.53 |
| 2011/0154203 A1 | 6/2011 | Spencer et al. | |
| 2011/0161419 A1* | 6/2011 | Chunilal | G06F 17/30867 709/204 |
| 2011/0208582 A1* | 8/2011 | Hoyle | G06F 8/60 705/14.49 |

(56) References Cited

U.S. PATENT DOCUMENTS

| | | | |
|---|---|---|---|
| 2011/0231240 A1* | 9/2011 | Schoen | G06Q 30/0242 705/14.41 |
| 2011/0264499 A1* | 10/2011 | Abendroth | G06Q 30/02 705/14.23 |
| 2011/0264535 A1 | 10/2011 | Lee et al. | |
| 2011/0276396 A1* | 11/2011 | Rathod | G06F 17/30867 705/14.49 |
| 2011/0282972 A1 | 11/2011 | Rosen | |
| 2011/0320274 A1 | 12/2011 | Patil | |
| 2012/0030593 A1 | 2/2012 | Arunachalam | |
| 2012/0042236 A1* | 2/2012 | Adler, III | G06F 17/214 715/234 |
| 2012/0072428 A1 | 3/2012 | Kao et al. | |
| 2012/0095836 A1 | 4/2012 | Kendall et al. | |
| 2012/0101898 A1 | 4/2012 | Kendall et al. | |
| 2012/0109757 A1 | 5/2012 | Kendall et al. | |
| 2012/0110080 A1 | 5/2012 | Panyam et al. | |
| 2012/0131448 A1 | 5/2012 | Chijiiwa et al. | |
| 2012/0151359 A1 | 6/2012 | Mysen et al. | |
| 2012/0158501 A1 | 6/2012 | Zhang et al. | |
| 2012/0185942 A1 | 7/2012 | Dixon et al. | |
| 2012/0203831 A1 | 8/2012 | Schoen et al. | |
| 2012/0203847 A1* | 8/2012 | Kendall | G06Q 30/02 709/206 |
| 2012/0204096 A1 | 8/2012 | Kendall et al. | |
| 2012/0208512 A1 | 8/2012 | Maharajh et al. | |
| 2012/0233009 A1 | 9/2012 | Fougner et al. | |
| 2012/0239750 A1 | 9/2012 | Schoen et al. | |
| 2012/0246232 A1 | 9/2012 | Schoen et al. | |
| 2013/0014030 A1 | 1/2013 | Schoen et al. | |
| 2013/0024250 A1 | 1/2013 | Wu et al. | |
| 2013/0073983 A1 | 3/2013 | Rasmussen et al. | |
| 2013/0159403 A1 | 6/2013 | Zigoris et al. | |
| 2013/0198008 A1 | 8/2013 | Kendall et al. | |
| 2013/0297702 A1 | 11/2013 | Schoen et al. | |
| 2014/0040042 A1 | 2/2014 | Schoen et al. | |
| 2014/0108965 A1 | 4/2014 | Schoen et al. | |
| 2014/0115500 A1 | 4/2014 | Schoen et al. | |
| 2014/0122249 A1 | 5/2014 | Schoen et al. | |
| 2014/0123034 A1 | 5/2014 | Schoen et al. | |
| 2014/0337142 A1 | 11/2014 | Li et al. | |

FOREIGN PATENT DOCUMENTS

| | | |
|---|---|---|
| CN | 101802787 A | 8/2010 |
| JP | H11-3348 A | 1/1999 |
| JP | 2002-092408 A | 3/2002 |
| JP | 2002-334257 A | 11/2002 |
| JP | 2003-316710 A | 11/2003 |
| JP | 2004-192166 A | 7/2004 |
| JP | 2006-309660 A | 11/2006 |
| JP | 2007-206876 | 8/2007 |
| JP | 2007-241558 | 9/2007 |
| JP | 2007-241894 | 9/2007 |
| JP | 2010-044303 A | 2/2010 |
| JP | 2010-063114 | 3/2010 |
| JP | 2012-523613 A | 10/2012 |
| KR | 10-2011-0032878 A | 3/2011 |
| WO | WO 98/09447 | 3/1998 |
| WO | WO 99/23783 | 5/1999 |
| WO | WO 2009/061616 A1 | 5/2009 |
| WO | WO 2009/061617 A1 | 5/2009 |
| WO | WO 2009/076755 A1 | 6/2009 |
| WO | WO 2010/117568 A1 | 10/2010 |
| WO | WO 2011/078975 A1 | 6/2011 |
| WO | WO 2012/082318 A1 | 6/2012 |

OTHER PUBLICATIONS

European Patent Office, Extended European Search Report, European Patent Application No. 08847154.5, Sep. 3, 2012, 9 Pages.
Wikipedia, "HTTP cookie," XP-002680841, 16 Pages, [online] [ retrieved on Jul. 26, 2012], Retrieved from the Internet <http://en.wikipedia.org/w/index.php?title= TYYP?cookie&oldid=168063574>.
Canadian Intellectual Property Office, Requisition by the Examiner, Canadian Patent Application No. 2,704,680, Jul. 25, 2012, 2 pages.
United States Patent and Trademark Office, Final Rejection, U.S. Appl. No. 13/338,190, Sep. 6, 2012, 89 pages.
Australian Patent Office, Examiner's First Report, Australian Patent Application No. 2008-324952, May 21, 2012, two pages.
Chinese State Intellectual Property Office of the People's Republic of China, Chinese Patent Application No. 2008-80114546.2, Oct. 14, 2011, eight pages.
PCT International Preliminary Report on Patentability, PCT Application No. PCT/US2008/080790, May 20, 2010, five pages.
PCT International Search Report and Written Opinion, PCT/US2008/080789, Dec. 12, 2008, seven pages.
United States Office Action, U.S. Appl. No. 12/853,241, May 22, 2012, thirty-one pages.
United States Office Action, U.S. Appl. No. 13/338,190, Mar. 27, 2012, fifty-two pages.
United States Office Action, U.S. Appl. No. 13/342,006, May 8, 2012, sixty-three pages.
The State Intellectual Property Office of the People's Republic of China, Rejection Decision, Chinese Patent Application No. 200880114546.2, Jun. 20, 2012, 9 pages (with English translation).
United States Patent and Trademark Office, Non-final Office Action, U.S. Appl. No. 13/447,100, Jul. 27, 2012, 35 pages.
U.S. Office Action, U.S. Appl. No. 13/327,557, Jun. 4, 2014, twenty-two pages.
Canadian Intellectual Property Office, Office Action, Canadian Patent Application No. 2,704,680, Sep. 13, 2013, two pages.
Canadian Intellectual Property Office, Office Action, Canadian Patent Application No. 2,703,851, Sep. 18, 2013, seven pages.
PCT International Search Report and Written Opinion, PCT Application No. PCT/US2008/080790, Dec. 19, 2008, nine pages.
PCT International Search Report and Written Opinion, PCT Application No. PCT/US2011/061545, Mar. 27, 2012, six pages.
PCT International Search Report and Written Opinion, PCT Application No. PCT/US2012/023631, Sep. 10, 2012, six pages.
PCT International Search Report and Written Opinion, PCT Application No. PCT/US2011/049076, Aug. 25, 2011, six pages.
U.S. Appl. No. 60/981,781, filed Oct. 22, 2007, Inventors: Gill et al.
U.S. Office Action, U.S. Appl. No. 12/193,702, Aug. 18, 2010, forty-nine pages.
U.S. Office Action, U.S. Appl. No. 12/193,702, Dec. 22, 2010, forty-eight pages.
U.S. Office Action, U.S. Appl. No. 12/193,702, Jan. 23, 2012, forty pages.
U.S. Office Action, U.S. Appl. No. 12/193,702, Jul. 25, 2011, forty-two pages.
U.S. Office Action, U.S. Appl. No. 12/193,702, Sep. 23, 2013, fifty-seven pages.
U.S. Office Action, U.S. Appl. No. 12/968,786, Dec. 21, 2012, eleven pages.
U.S. Office Action, U.S. Appl. No. 12/968,786, Aug. 14, 2013, nine pages.
U.S. Office Action, U.S. Appl. No. 12/853,241, Apr. 22, 2013, thirty-nine pages.
U.S. Office Action, U.S. Appl. No. 12/853,241, Nov. 20, 2013, forty pages.
U.S. Office Action, U.S. Appl. No. 13/342,003, Apr. 5, 2013, fifty-six pages.
U.S. Office Action, U.S. Appl. No. 13/342,003, Dec. 12, 2012, thirty-four pages.
U.S. Office Action, U.S. Appl. No. 13/342,003, Sep. 25, 2013, forty pages.
U.S. Office Action, U.S. Appl. No. 13/447,100, Apr. 24, 2013, thirty-five pages.
U.S. Office Action, U.S. Appl. No. 13/447,100, Nov. 14, 2012, thirty-five pages.
U.S. Office Action, U.S. Appl. No. 13/447,100, Aug. 14, 2013, forty-six pages.
U.S. Office Action, U.S. Appl. No. 13/327,557, May 10, 2013, nineteen pages.

(56) References Cited

OTHER PUBLICATIONS

U.S. Office Action, U.S. Appl. No. 13/327,557, Feb. 21, 2014, seventeen pages.
U.S. Office Action, U.S. Appl. No. 13/488,275, Sep. 4, 2012, ten pages.
U.S. Office Action, U.S. Appl. No. 13/488,596, Sep. 18, 2012, ten pages.
U.S. Office Action, U.S. Appl. No. 13/619,894, Jan. 7, 2013, seven pages.
U.S. Office Action, U.S. Appl. No. 13/619,894, Sep. 24, 2013, four pages.
U.S. Office Action, U.S. Appl. No. 13/804,150, Feb. 21, 2014, fifty-five pages.
U.S. Office Action, U.S. Appl. No. 14/048,034, Dec. 6, 2013, seven pages.
Australian Government, IP Australia, Patent Examination Report No. 1, Australian Patent Application No. 2012212117, dated Nov. 17, 2015, four pages.
Australian Patent Office, Patent Examination Report No. 1, Australian Patent Application No. 2011341576, dated Mar. 24, 2016, two pages.
Canadian Intellectual Property Office, Office Action, Canadian Patent Application No. 2,704,680, dated Jun. 8, 2015, three pages.
Canadian Intellectual Property Office, Office Action, Canadian Patent Application No. 2,825,760, dated Jan. 16, 2015, five pages.
Canadian Intellectual Property Office, Office Action, Canadian Patent Application No. 2,820,214, dated May 31, 2017, four pages.
European Patent Office, Extended Search Report and Opinion, European Patent Application No. 11848342.9, dated Apr. 8, 2016, six pages.
European Patent Office, Supplementary Search Report and Opinion, European Patent Application No. 12741731.9, dated Apr. 4, 2016, six pages.
Japan Patent Office, Office Action, Japanese Patent Application No. 2013-544502, dated Jul. 14, 2015, six pages.
Japan Patent Office, Office Action, Japanese Patent Application No. 2013-544502, dated Mar. 8, 2016, eight pages.
Japanese Patent Office, Office Action, Japanese Patent Application No. 2013-552629, dated Nov. 4, 2015, eight pages.
Korea Intellectual Property Office, Office Action, Korean Patent Application No. 10-2013-7018119, dated Jun. 14, 2017, fifteen pages.
Mexican Institute of Industrial Property, Division of Patents, Office Action, Mexican Patent Application No. MX/a/2013/006825, dated Dec. 9, 2014, four pages [with summary in English].
Mexican Institute of Industrial Property, Division of Patents, Office Action, Mexican Patent Application No. MX/a/2013/006825, dated May 24, 2016, seven pages [with summary in English].
Mexican Institute of Industrial Property, Division of Patents, Office Action, Mexican Patent Application No. MX/a/2013/006825, dated Nov. 29, 2016, seven pages [with summary in English].
Mexican Institute of Industrial Property, Office Action, Mexican Patent Application No. MX/a/2013/008792, dated Mar. 17, 2015, four pages.
PCT International Search Report and Written Opinion, PCT Application No. PCT/US2011/049076, dated Apr. 27, 2012, six pages.
PCT International Search Report and Written Opinion, PCT Application No. PCT/US2013/043189, dated Aug. 28, 2013, eleven pages.
State Intellectual Property Office of the People's Republic of China, First Office Action, Chinese Patent Application No. 2012800169146, dated Jan. 28, 2016, eleven pages.
State Intellectual Property Office of the People's Republic of China, First Office Action, Chinese Patent Application No. 2012800169146, dated Nov. 30, 2016, seven pages.
State Intellectual Property Office of the People's Republic of China, First Office Action, Chinese Patent Application No. 201180067562.2, dated Oct. 9, 2015, seventeen pages.
State Intellectual Property Office of the People's Republic of China, Second Office Action, Chinese Patent Application No. 201180067562.2, dated Jul. 5, 2016, sixteen pages.
State Intellectual Property Office of the People's Republic of China, Decision of Rejection, Chinese Patent Application No. 201180067562.2, dated Nov. 24, 2016, twelve pages.
State Intellectual Property Office of the People's Republic of China, Notification of Reexamination, Chinese Patent Application No. 201180067562.2, dated Sep. 25, 2017, fifteen pages.
U.S. Office Action, U.S. Appl. No. 12/853,241, dated Aug. 18, 2014, thirty-two pages.
U.S. Office Action, U.S. Appl. No. 12/853,241, dated Nov. 20, 2014, nine pages.
U.S. Office Action, U.S. Appl. No. 13/804,150, dated Jul. 22, 2014, twenty-four pages.
U.S. Office Action, U.S. Appl. No. 13/804,150, dated Nov. 25, 2014, fourteen pages.
U.S. Office Action, U.S. Appl. No. 13/938,139, dated Oct. 23, 2014, ten pages.
U.S. Office Action, U.S. Appl. No. 14/137,820, dated Nov. 5, 2014, five pages.
U.S. Office Action, U.S. Appl. No. 14/137,825, dated Feb. 9, 2016, twelve pages.
U.S. Office Action, U.S. Appl. No. 14/137,825, dated Feb. 16, 2017, ten pages.
U.S. Office Action, U.S. Appl. No. 14/137,825, dated Jul. 29, 2016, six pages.
U.S. Office Action, U.S. Appl. No. 14/137,829, dated Sep. 26, 2016, seven pages.
U.S. Office Action, U.S. Appl. No. 14/137,834, dated Apr. 12, 2016, eleven pages.
U.S. Office Action, U.S. Appl. No. 14/340,360, dated Jan. 9, 2015, five pages.
U.S. Office Action, U.S. Appl. No. 14/340,360, dated Jul. 2, 2015, seven pages.
U.S. Office Action, U.S. Appl. No. 14/340,360, dated Oct. 6, 2014, seven pages.
U.S. Office Action, U.S. Appl. No. 14/792,528, dated Jul. 25, 2016, eighteen pages.
U.S. Office Action, U.S. Appl. No. 14/792,528, dated Oct. 8, 2015, seventeen pages.
United States Patent and Trademark Office, Before the Patent Trial and Appeal Board, Decision on Appeal, Appeal No. 2017-003261, U.S. Appl. No. 14/340,360, dated Sep. 29, 2017, seven pages.
United States Patent and Trademark Office, Before the Patent Trial and Appeal Board, Decision on Request for Rehearing, Appeal No. 2015-008182, U.S. Appl. No. 12/853,241, dated Aug. 25, 2017, twelve pages.
United States Patent and Trademark Office, Before the Patent Trial and Appeal Board, Decision on Appeal, Appeal No. 2016-002048, U.S. Appl. No. 13/804,150, dated Aug. 25, 2017, fourteen pages.
Korea Intellectual Property Office, Office Action, Korean Patent Application No. 10-2013-7018119, dated Dec. 19, 2017, six pages.
Korean Intellectual Property Office, Office Action, Korean Patent Application No. 10-2013-7018119, dated Mar. 19, 2018, seven pages.
State Intellectual Property Office of the People's Republic of China, Notification of Reexamination, Chinese Patent Application No. 201180067562.2, dated Mar. 9, 2018, ten pages.
Communication pursuant to Article 94(3) EPC for European Patent Application No. EP 11848342.9, dated Apr. 13, 2018, ten pages.
Canadian Intellectual Property Office, Office Action, Canadian Patent Application No. 2,820,214, dated May 22, 2018, eight pages.

* cited by examiner

SPONSORED STORIES AND NEWS STORIES WITHIN A NEWSFEED OF A SOCIAL NETWORKING SYSTEM

CROSS REFERENCE TO RELATED APPLICATIONS

This application is a continuation of U.S. application Ser. No. 12/193,702, filed Aug. 18, 2008 (issued Aug. 5, 2014), which claims the benefit of U.S. Provisional Application No. 60/985,631, filed Nov. 5, 2007, which are both incorporated by reference in their entireties.

BACKGROUND

This invention relates generally to social networking websites and other websites in which users can form connections with each other, and in particular to using those connections in the websites to generate and communicate social advertisements and other messages.

Social networks, or social utilities that track and enable connections between members (including people, businesses, and other entities), have become prevalent in recent years. In particular, social networking websites allow members to communicate information more efficiently. For example, a member may post contact information, background information, job information, hobbies, and/or other member-specific data to a location associated with the member on a social networking website. Other members can then review the posted data by browsing member profiles or searching for profiles including specific data. The social networking websites also allow members to associate themselves with other members, thus creating a web of connections among the members of the social networking website. These connections among the members can be exploited by the website to offer more relevant information to each member in view of the members' own stated interests in their connections.

Social networking websites typically incorporate a system for connecting members to content that is most likely to be relevant to each member. For example, members may be grouped according to one or more common attributes in their profiles, such as geographic location, employer, job type, age, music preferences, interests, or other attributes. Members of the social networking website or external parties can then use these groups to customize or target information delivery so that information that might be of particular interest to a group can be communicated to that group.

Advertisers have attempted to leverage this information about members, targeting their ads to members whose interests best align with the ads. For example, a social networking website may display banner ads for a concert to members who include an affinity for the performing band in their website profile and live near a concert venue where that band might be performing. However, these attempts are no different than targeting of ads that exist in many other contexts. Advertisers have not yet been able to exploit the relationships and connections among members of a social networking website in a meaningful way to present their advertising message to consumers.

SUMMARY

To present advertising that is more effective than traditional targeted online advertising, a social networking website uses the information it obtains about its members' actions and their connections to other members of the website. Rather than merely deliver a message that is targeted to a particular member based on the member's preferences, embodiments of the invention present advertisements that communicate information about actions taken by others in the member's network (i.e., the member's friends and other relationships and connections in the social networking website) —or "social ads." A social ad, for example, may inform a member that a friend (or a number of friends) of the member has purchased a particular item made by an advertiser, will attend an event sponsored by an advertiser, or has added a connection to a profile for a business or other entity.

Social ads allow advertisers to leverage one member's actions to promote specific content to others who might be interested in that information—not only because they might have similar interests, but also because of their connection with the member. This mode of advertising may be more effective because members are more likely to be influenced to respond to an advertiser's message in the presence of information that their friends or other connections have also taken an action related to the advertiser. Social ads thus allow advertisers to enjoy the credibility that consumers naturally give to their friends through word of mouth advertising. Beyond simple targeting of ads that merely chase demand, therefore, this approach is better able to create or generate demand by providing the socially related information to members about their friends' actions.

In one embodiment, a social networking website collects and logs information about actions taken by members of the website. These logged actions may be actions in connection with the social networking website and/or its members, with another website, or real world actions captured and communicated to the social networking website. At a certain point when a particular member is accessing the social networking website, the website presents the member with information about actions taken by other members with whom the member is associated (i.e., the member's "friends"). The actions that are communicated may be of a commercial nature, where a third party advertiser desires to communicate information about or related to the actions to the member's friends. The actions are communicated by presentation of social ads to the members. The social ads may be presented to a member while the member is using the social networking website, or as the member is using other websites.

In one embodiment, the selection of the friends to receive a given social ad is made so as to maximize the advertising revenue to the social networking website, particularly in cases where the resources to publish the ads are limited, for example, in terms of the available area on a screen display for showing the social ads. In one advertising model, each advertiser may bid a certain amount of money for each instance that a member clicks on or takes some other follow-on action with respect to the social ad. To increase the advertising revenue, the social networking website selects which social ads to present to a particular member based on the expected revenue values for each of the qualified ads. The expected revenue value for a social ad may be a function of a member's affinity for the content of the information in the social ad (which acts as a proxy for the likelihood that a member will click on the social ad) and the amount of money that the social networking website will receive for that action. In some cases the expected revenue value may additionally be a function of the member's likelihood of clicking on an ad based on other ads the member has clicked on in the past.

The features and advantages described in this summary and the following detailed description are not all-inclusive. Many additional features and advantages will be apparent to one of ordinary skill in the art in view of the drawings, specification, and claims hereof.

Figure 1:
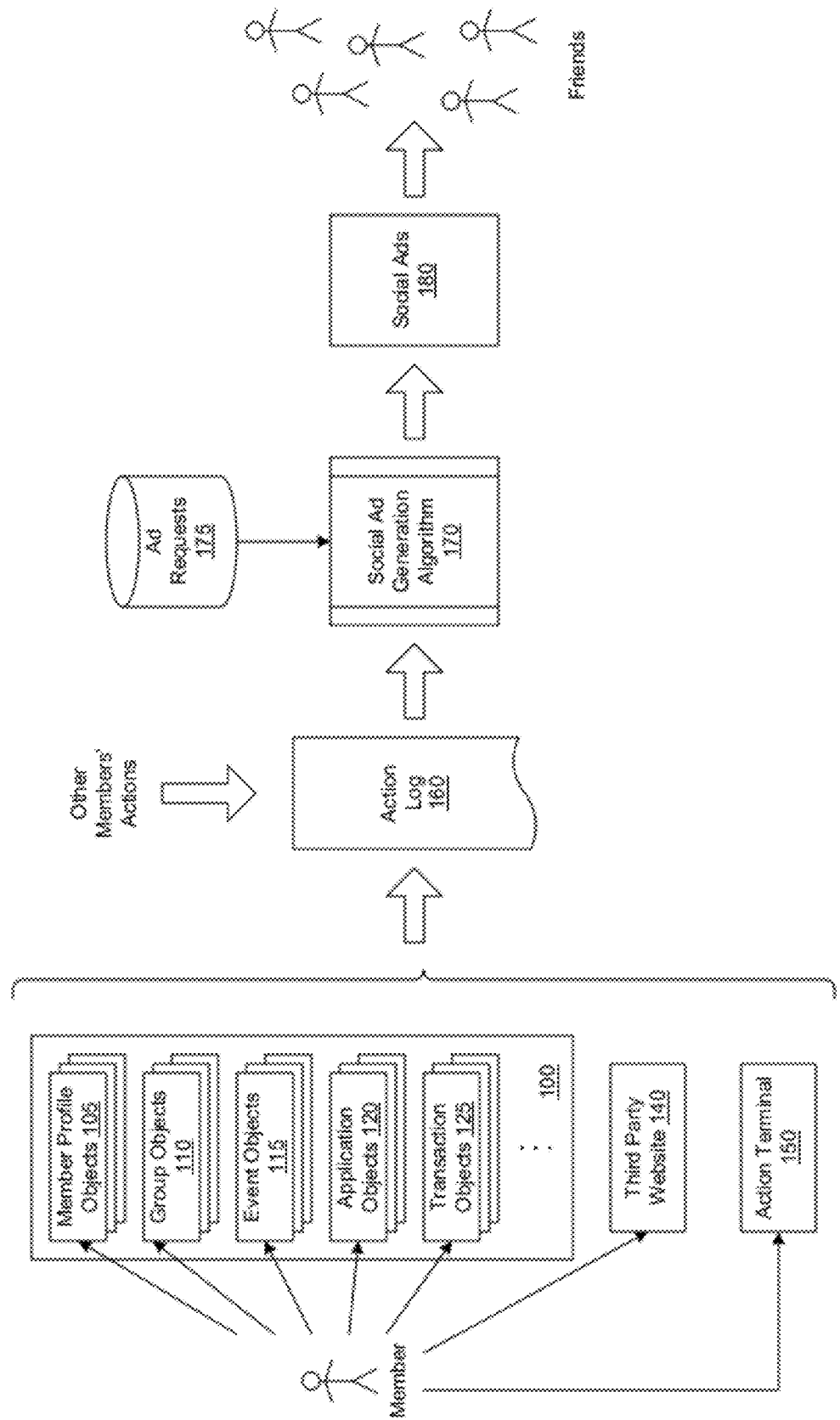
FIG. 1 is an event diagram illustrating the collection of member actions and the creation of social ads for the member's friends on the website, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Advertising Related to Member Actions on a Website

A social networking website offers its members the ability to communicate and interact with other members of the website. In use, members join the social networking website and then add connections to a number of other members to whom they desire to be connected. As used herein, the term "friend" refers to any other member to whom a member has formed a connection, association, or relationship via the website. Connections may be added explicitly by a member, for example, the member selecting a particular other member to be a friend, or automatically created by the social networking site based on common characteristics of the members (e.g., members who are alumni of the same educational institution). Connections in social networking websites are usually in both directions, but need not be, so the terms "member" and "friend" depend on the frame of reference. For example, if Bob and Joe are both members and connected to each other in the website, Bob and Joe, both members, are also each other's friends. The connection between members may be a direct connection; however, some embodiments of a social networking website allow the connection to be indirect via one or more levels of connections. Also, the term friend need not require that members actually be friends in real life, (which would generally be the case when one of the members is a business or other entity); it simply implies a connection in the social networking website.

In addition to interactions with other members, the social networking website provides members with the ability to take actions on various types of items supported by the website. These items may include groups or networks (where "networks" here refer not to physical communication networks, but rather social networks of people) to which members of the website may belong, events or calendar entries in which a member might be interested, computer-based applications that a member may use via the website, and transactions that allow members to buy or sell items via the website. These are just a few examples of the items upon which a member may act on a social networking website, and many others are possible.

As illustrated, the social networking website 100 maintains a number of objects for the different kinds of items with which a member may interact on the website 100. In one example embodiment, these objects include member profiles 105, group objects 110, event objects 115, application objects 120, and transaction objects 125 (respectively, hereinafter, groups 110, events 115, applications 120, and transactions 125). In one embodiment, an object is stored by the website 100 for each instance of its associated item. For example, a member profile 105 is stored for each member who joins the website 100, a group 110 is stored for each group defined in the web site 100, and so on. The types of objects and the data stored for each is described in more detail below in connection with FIG. 3, which illustrates an embodiment of the social networking website 100.

The member of the website 100 may take specific actions on the website 100, where each action is associated with one or more objects. The types of actions that a member may perform in connection with an object is defined for each object and largely depends on the type of item represented by the object. A particular action may be associated with multiple objects. Described below are a number of examples of particular types of objects that may be defined for the social networking website 100, as well as a number of actions that can be taken for each object. These objects and the actions discussed herein are provided for illustration purposes only, and it can be appreciated that an unlimited number of variations and features can be provided on a social networking website 100.

The social networking website 100 maintains a member profile 105 for each member of the website 100. Any action that a particular member takes with respect to another member is associated with each member's profile 105. Such actions may include, for example, adding a connection to the other member, sending a message to the other member, reading a message from the other member, viewing content associated with the other member, attending an event posted by another member, among others. In addition, a number of actions described below in connection with other objects are directed at particular members, so these actions are associated with those members as well.

A group 110 may be defined for a group or network of members. For example, a member may define a group to be a fan club for a particular band. The website 100 would maintain a group 110 for that fan club, which might include information about the band, media content (e.g., songs or music videos) by the band, and discussion boards on which members of the group can comment about the band. Accordingly, member actions that are possible with respect to a group 110 might include joining the group, viewing the content, listening to songs, watching videos, and posting a message on the discussion board.

Similarly, an event 115 may be defined for a particular event, such as a birthday party. A member may create the event 115 by defining information about the event such as the time and place and a list of invitees. Other members may accept the invitation, comment about the event, post their own content (e.g., pictures from the event), and perform any other actions enabled by the website 100 for the event 115. Accordingly, the creator of the event 115 as well as the invitees for the event may perform various actions that are associated with that 115.

The social networking website may also enable members to add applications to their profiles. These applications provide enhanced content and interactivity within the social networking website 100, which maintains an application object 120 for each application hosted in the system. The applications may be provided by the website operator and/or by third party developers. An example application is an enhanced messaging service, in which members can send virtual objects (such as a "gift" or "flowers") and an optional message to another member. The use of any functionality offered by the application may thus constitute an action by the member in connection with the application 120. In addition, continuing the example from above, the receipt of the virtual gift or message may also be considered an action in connection with the application 120. It can therefore be appreciated that actions may be passive and need not require active participation by a member.

Another type of object shown in the example of FIG. 1 is a transaction 125. A transaction object enables members to make transactions, such as buying, selling, renting, trading, or exchanging with other members. For example, a member may post a classified ad on the social networking website 100 to sell a car. The member would thus define a new transaction 125, which may include a description of the car, a picture, and an asking price. Other members can then view this information and possibly interact further with the transaction 125 by posting questions about the car and accepting the offer or making a counteroffer. Each of these interactions—view, question posting, offer, and counteroffer—are actions that are associated with the particular transaction 125.

When a member takes an action on the social networking website 100, the action is recorded in an action log 160. In one embodiment, the website 100 maintains the action log 160 as a database of entries. When an action is taken on the website 100, therefore, the website 100 adds an entry for that action to the log 160. In one embodiment, an entry comprises some or all of the following information:

Time: a timestamp of when the action occurred.

Member: an identifier for the member who performed the action.

Target: an identifier for the member to whom the action was directed.

Action Type: an identifier for the type of action performed.

Object: an identifier for an object acted on by the action.

Content: content associated with the action.

It can be appreciated that many types of actions that are possible in the web site 100 need not require all of this information. For example, if a member changes a picture associated with the member's profile, the action may be logged with just the member's identifier, an action type defining a picture change, and the picture or a link thereto as the content.

In one embodiment, the social networking website 100 also logs actions that a member takes on a third party website 140. The social networking website 100 may learn of the member's actions on the third party website 140 via any of a number of methods. For example, the third party website 140 may send a message to the social networking website 100 when a particular action by a member occurs on the third party website 140. In one example, if the third party website 140 is a commercial website on which members may purchase items, the third party website 140 may inform the social networking website 100 when a member of the social networking website 100 buys an item on the third party website 140.

In another embodiment, the social networking website 100 logs actions taken by its members in the real world. These actions may be recorded by an action terminal 150, which observes qualifying actions and then communicates that action to the social networking website 100. The communication may be via email, SMS, or any other appropriate means, where the communicated message includes sufficient information for the social networking website 100 to populate the action log 160 with an entry describing the action. The action terminal 150 may comprise any suitable devices or systems for the particular type of action to be tracked.

In one embodiment, the action to be tracked is a credit card transaction, where a member of the social networking website 100 may optionally opt in by registering a credit card. When the registered credit card is used in a qualifying way (e.g., a purchase made at a point of sale), the credit card company (or clearinghouse) sends a message to the social networking website 100. In this scenario, a computing system at the credit card company or clearinghouse serves as a action terminal 150. The message may contain information about the credit card transaction, such the item purchased, the date, and location of the purchase. The social networking system thus tracks real-world actions such as this purchase in the action log 160.

Another example illustrating real-world actions that may be tracked involves the member's location. A member may configure a cellular phone having location technology (e.g., GPS) to communicate the member's location to the social networking website 100. This may be accomplished, for example, by downloading an application to the cellular phone, where the application polls the location unit in the phone and sends a message containing the member's location to the social networking website 100. This may be performed periodically or upon certain triggering events associated with locations. For example, a triggering event can include the member being within to a specific city, or at particular destination such as a restaurant, business, or venue. In this application, the cellular phone (or other GPS-enabled device) serves as the action terminal 150.

Another example illustrating real-world actions that may be tracked involves what program material the member is accessing on a television system. A television and/or set-top receiver may act as an action terminal 150 and transmit a message indicating that a member is viewing (or recording) a particular program on a particular channel at a particular time. Again, these examples are presented to illustrate some of the types of devices and actions that may be captured as actions by a member and communicated to the social networking website 100. A limitless variety of other applications may be implemented to capture real-world actions associated with a particular member and send that information to the social networking website 100.

After an amount of time, the action log 160 will become populated with a number of entries that describe actions taken by the members of the social networking website 100. The action log 160 thus contains a very rich set of data about the actions of the members, and can be analyzed and filtered to identify trends and relationships in the actions of the members, as well as affinities between the members and various objects. This action log can, in some cases, be filtered to include only actions that are likely to be interesting to other members.

At some point in its operation, the social networking website 100 will need to obtain a social ad 180 to display on the website. FIG. 1 illustrates a process in which a social ad is generated for one of the friends of the member. To generate a social ad 180 for one of the member's friends, the website 100 accesses the action log 160 and a database of ad requests 175. The database of ad requests 175 include a number of requests that define criteria for creating a social ad 180. Using the ad requests 175 and the action log 160, the website 100 applies a social ad generation algorithm 170 to create one or more social ads 180 tailored for the particular friend. Each generated social ad 180 comprises an advertising message that communicates a message about at least one member action from the action log 160. In one embodiment, the social ad 180 communicates a message about the actions of some number of friends of the member. For example, a member may receive a message like "Three of your friends have joined the "Yale Alumni Network." The advertising message may also include additional content from the advertiser. The advertising message is communicated to the friend, for example as a message on the friend's home page, in an email message, in a list or newsfeed of other advertising messages and stories describing various actions taken, or any other electronic communication medium. The ad requests 175 and the ad generation algorithm 170 are described in more detail below.

In another embodiment, the action log can be divided into multiple action logs, each such action logs containing actions taken by a particular member. The actions could also be stored initially in these member specific action logs. To generate a social ad for a particular member, the website would access the action logs of the member's friends and a database of ad requests. Using the ad requests and one or more of the action logs, the website applies a social ad generation algorithm to create one or more social ads tailored for the particular member.

Website Architecture

Figure 2:
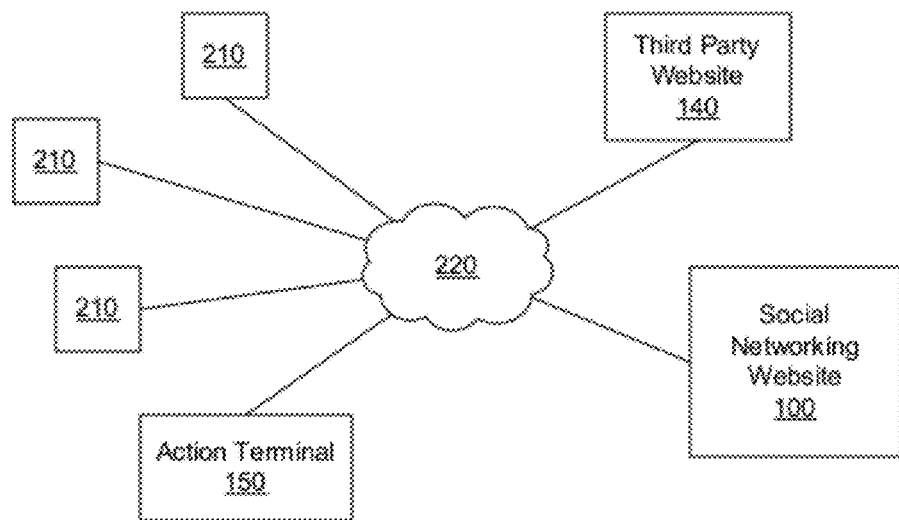
FIG. 2 is a network diagram of a system for providing social ads to members of a social networking website, in accordance with an embodiment of the invention.

FIG. 2 is a high level block diagram illustrating a system environment suitable for operation of a social networking website 100. The system environment comprises one or more client devices 210, one or more third-party websites 140, a social networking website 100, and a network 220. In alternative configurations, different and/or additional modules can be included in the system.

The client devices 210 comprise one or more computing devices that can receive member input and can transmit and receive data via the network 220. For example, the client devices 210 may be desktop computers, laptop computers, smart phones, personal digital assistants (PDAs), or any other device including computing functionality and data communication capabilities. The client devices 220 are configured to communicate via network 220, which may comprise any combination of local area and/or wide area networks, using both wired and wireless communication systems. As described above, the third party website 140 and the action terminal 150 are coupled to the network 220 for communicating messages to the social networking website 100 about the members' actions off the website 100.

The social networking website 100 comprises a computing system that allows members to communicate or otherwise interact with each other and access content as described herein. The social networking website 100 stores member profiles that describe the members of a social network, including biographic, demographic, and other types of descriptive information, such as work experience, educational history, hobbies or preferences, location, and the like. The website 100 further stores data describing one or more relationships between different members. The relationship information may indicate members who have similar or common work experience, group memberships, hobbies, or educational history. Additionally, the social network host site 230 includes member-defined relationships between different members, allowing members to specify their relationships with other members. For example, these member defined relationships allows members to generate relationships with other members that parallel the members' real-life relationships, such as friends, co-workers, partners, and so forth. Members may select from predefined types of relationships, or define their own relationship types as needed.

Figure 3:
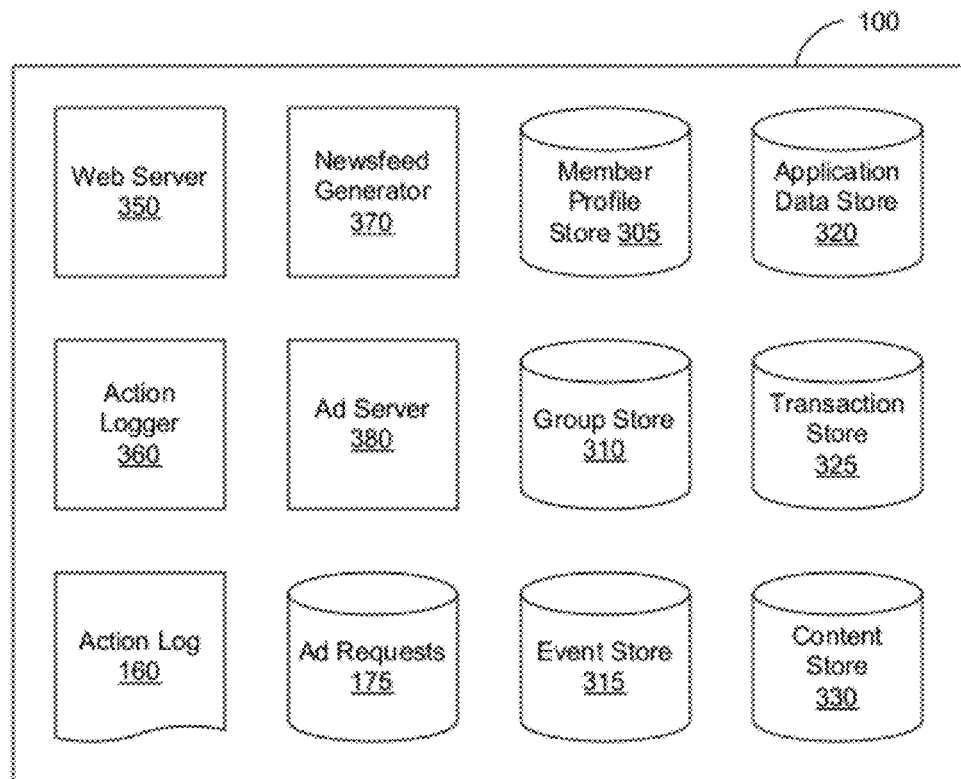
FIG. 3 is a block diagram of a social networking website, in accordance with an embodiment of the invention.

FIG. 3 is an example block diagram of a social networking website 100. The social networking website 100 includes a web server 350, an action logger 360, an action log 160, a newsfeed generator 370, an ad server 380, a database of ad requests 175, a member profile store 305, a group store 310, an event store 315, an application data store 320, a transaction store 325, and a content store 330. In other embodiments, the social networking website 100 may include additional, fewer, or different modules for various applications.

The web server 350 links the social networking website 100 via the network 220 to one or more client devices 210, as well as to one or more third party websites 140. The web server 350 may include a mail server or other messaging functionality for receiving and routing messages between the social networking website 100 and the client devices 210 or third party websites 140. The messages can be instant messages, queued messages (e.g., email), text and SMS messages, or any other suitable messaging technique.

The action logger 360 is capable of receiving communications from the web server 350 about member actions on and/or off the social networking website 100. As described in more detail below in connection with FIG. 4, the action logger 360 populates the action log 160 with information about these member actions tracked in the log 160.

The newsfeed generator 370 generates communications for each member about information that may be relevant to the member. These communications may take the form of stories, each story is an information message comprising one or a few lines of information about an action in the action log that is relevant to the particular member. The stories are presented to a member via one or more pages of the social networking website 100, for example in each member's home page or newsfeed page. The operation of the newsfeed generator 370 is described in more detail below in connection with FIGS. 4 and 6.

The ad server 380 performs the ad selection algorithm 170 discussion above. The operation of the ad server 380 is described in more detail below in connection with FIGS. 4 and 9. The ad server 380 is communicatively coupled to the database of ad requests 175 and to the action log 160 for this purpose.

As discussed above, the social networking website 100 maintains data about a number of different types of objects with which a member may interact on the website 100. To this end, each of the member profile store 305, the group store 310, the event store 315, the application data store 320, and the transaction store 325 stores a data structure to manage the data for each instance of the corresponding type of object maintained by the website 100. The data structures comprise information fields that are suitable for the corresponding type of object. (For example, the event store 315 contains data structures that include the time and location for an event, whereas the member profile store 305 contains data structures with fields suitable for describing a member's profile.) When a new object of a particular type is created, the website 100 initializes a new data structure of the corresponding type, assigns a unique object identifier to it, and begins to add data to the object as needed. This might occur, for example, when a member defines a new event, wherein the website 100 would generate a new instance of an event in the event store 315, assign a unique identifier to the event, and begin to populate the fields of the event with information provided by the member.

Publishing Social Information, Stories, and Advertisements to Members

Figure 4:
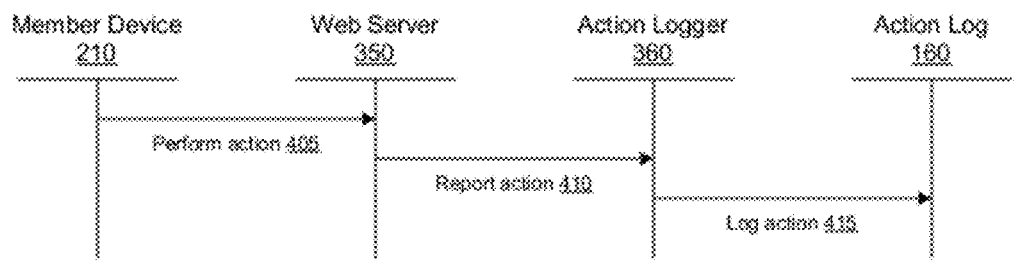
FIG. 4 is an interaction diagram of a process for logging member actions, in accordance with an embodiment of the invention.

FIG. 4 illustrates a process in which member actions are logged in the action log 160, in one embodiment. In this process, a member uses a member client device 210 to perform 405 an action in connection with the social networking website 100. This action may be a member selection of a link on the website 100 using the member client device 210, and the selection of the link is thus received by the web server 350. As described above, however, the website 100 may receive messages from third party websites 140 and/or from action terminals 150 about member actions performed off the social networking website 100. Upon notification of the member's action, the web server 350 reports 410 the action to the action logger 360, which logs 415 the action in the action log as described above.

This process for obtaining log entries in the action log 10 of various member actions repeats each time a member of the social networking website 100 performs an action. In this way, the action log 10, over time, may store a rich information set about the actions of the website's members, which can then be leveraged for marketing purposes. The website 100 may ignore certain member actions, such as those that have little or no significance to the purpose of the system, to avoid using memory and computing resources to track actions that are insignificant.

Figure 5:
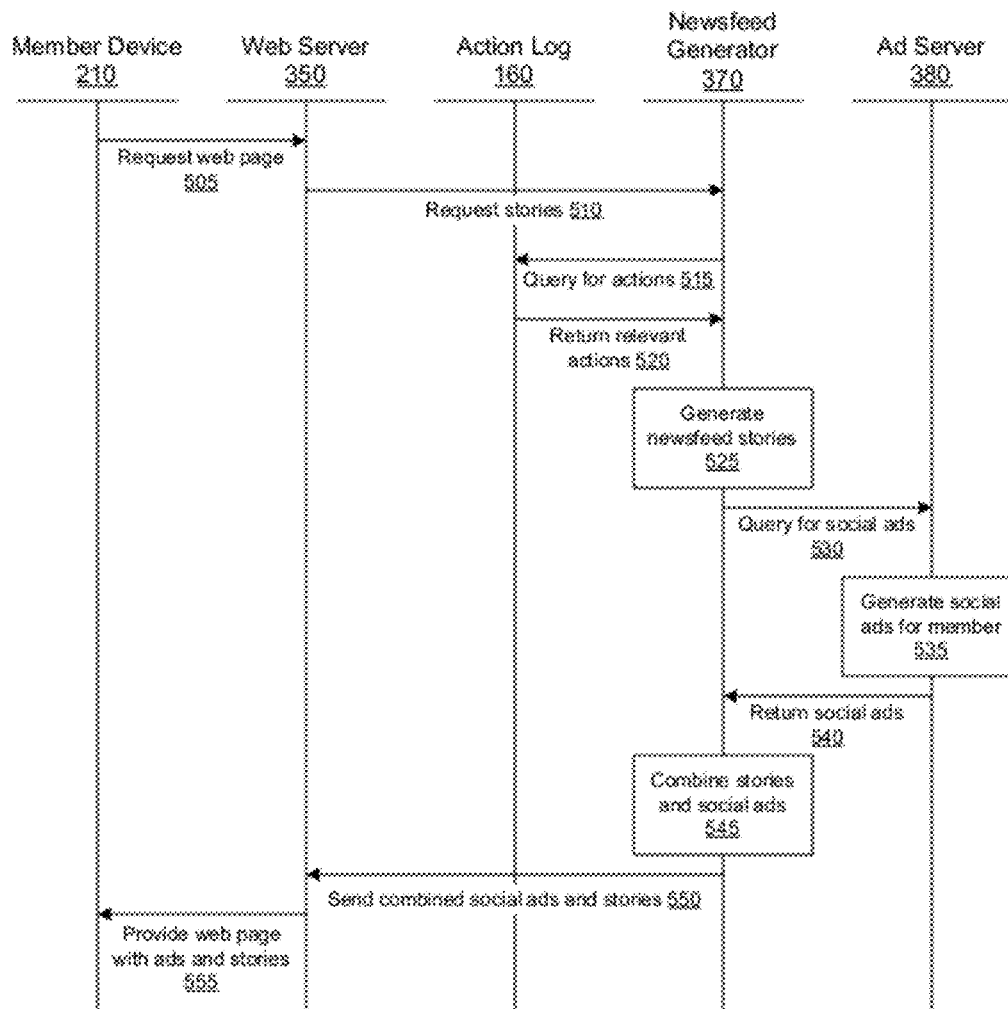
FIG. 5 is an interaction diagram of a process for generating a social ad, in accordance with an embodiment of the invention.

FIG. 5 illustrates a process for generating social ads in accordance with one embodiment of the invention. In this embodiment, the process for generating social ads is used for a social networking website 100 that also publishes information to its members about the actions of other members to whom the members are connected, in this case, friends. This information published to members about their friends outside the context of the social ads is provided in the form of short newsfeed stories (information messages) about the members' friends. The newsfeed stories are displayed to a member on a member's home page, for example. For each member, the website 100 is configured to generate a personalized set of newsfeed stories and social ads that are likely to be relevant to the member. Although described in the newsfeed context, in other embodiments the social ads may be generated by the website 100 and published to members in a website 100 that does not use newsfeed stories or publishes the social ads outside the context of newsfeed stories, such as in banner ads.

In a first step, a member requests 505 a web page from the social networking website 100 via the member device 210. This may be an initial web page that is presented when a member logs into the website 100, or it may be any other page displayed by the website 100 in response to member selections. The web server 350 handles the request and, determining that the requested web page will require the display of a social ad, the web server 350 begins the process of generating the social ad in the website 100. The web server 350 requests 510 stories from the newsfeed generator 370. As mentioned above, this request 510 includes a request for stories as well as social advertisements, as both of these items may be presented in the same interface as items that contain information about the actions that concern people or other objects on the website 100 in which the member has an interest. Social ads thus can be, at least in some cases, paid or sponsored stories. In other embodiments, the web server 350 may merely request a social ad for display on the requested web page.

In response to the request for stories, the newsfeed generator 370 queries 515 the action log 160 for information that may be relevant to the member, based on the member's action and profile properties, and the action log 160 returns 520 the requested set of actions to the newsfeed generator 370. The newsfeed generator 370 then generates 525 the newsfeed stories using this information. One embodiment of a process for requesting relevant information and generating the newsfeed stories is described in more detail in connection with FIG. 6.

Figure 8:
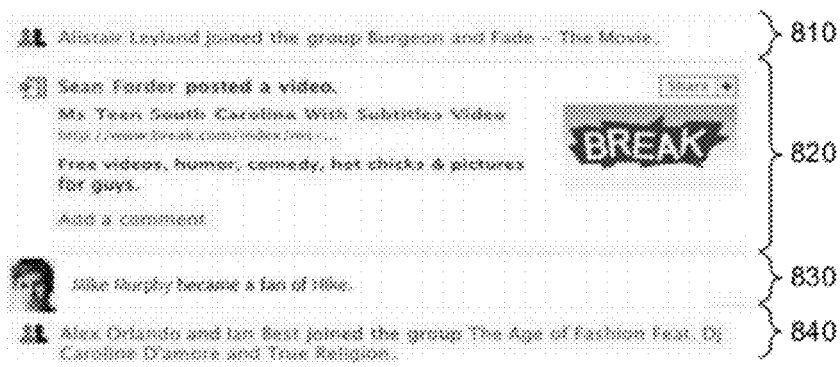
FIG. 8 is a portion of a web page showing a combination of newsfeed stories and social ads, in accordance with an embodiment of the invention.

In addition to generating 525 newsfeed stories, the newsfeed generator 370 queries 530 the ad server 380 for one or more social ads. The ad server 380 generates 535 the requested social ads according to a social ad generation algorithm 170 (see FIG. 1). One embodiment of a process for generating the social ad is described in more detail in connection with FIG. 9. Once the social ad is generated 535, the ad server 380 returns 540 the social ad to the newsfeed generator 370. The newsfeed generator 370 then combines 545 the newsfeed stories and the social ads into a single list and sends 550 them to the web server 350 for presentation to the member. The web server 350 then publishes the newsfeed stories and the social ads on the requested web page and provides 555 the web page to the member. The member is thus presented with relevant information about the member's friends' actions. This information may be paid for by an advertiser and may include additional information about that advertiser, its products, and/or its services. Described in more detail below, FIG. 8 is an example of a combination of newsfeed stories and social ads presented on a web page to a member.

Figure 6:
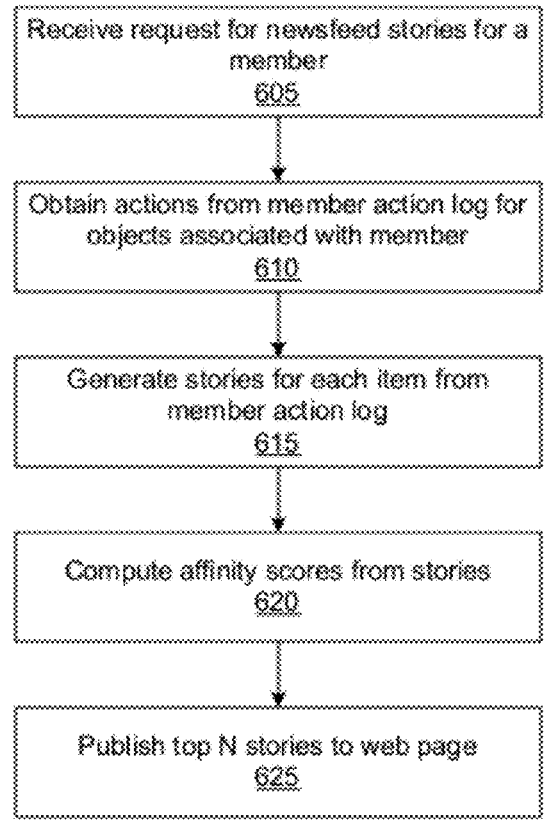
FIG. 6 is a flow chart of a process for generating newsfeed stories, in accordance with an embodiment of the invention.

FIG. 6 illustrates a process for generating newsfeed stories in connection with member actions on a social networking website 100. This process may be performed by a newsfeed generator 370 in the website 100, as in the process illustrated in FIG. 5. The newsfeed generator 370 receives 605 a request for a set of newsfeed stories for a particular member. In response, the newsfeed generator 370 obtains 610 a listing of any actions contained in the action log 160 that are related to the member. In one embodiment, entries in the action log 160 are considered to be related to the member if they contain one of the member's friends or another object (such as an event or group) with which the member is connected. The objects with which a member is connected may be defined in the member's profile. Various other rules may be defined for determining whether particular entries in the action log 160 are relevant to a particular member, depending on the goal and purpose of the system.

Figure 7:
FIG. 7 is a generic newsfeed story, in accordance with an embodiment of the invention.

Once the relevant actions are obtained, the newsfeed generator 370 generates 615 a newsfeed story for each action. The stories may contain varying amounts of information, depending on the type of action that is being reported. FIG. 7 illustrates a generic newsfeed story, which contains a member field 705, an action field 710, an optional target field 715, an optional object field 720, and an optional content field 725. An example newsfeed story that conforms to this story format is:

[Member field 705] [Action field 710] [Target field 715] [Object field 720].

An example newsfeed story in this format is:

"John Smith invited Bob Roberts to John's 21st Birthday Party"

where the member target are link anchors to the respective members, and the object is a link anchor to an event. The example story above may further include graphics, links, or other content information for the Content field 725.

Because screen real estate is limited, and because for a given member there could be hundreds, potentially thousands, of stories that could displayed at any given time, the newsfeed generator 370 must generally select a subset of all the possible newsfeed stories for display to the member. Preferably, the newsfeed generator 370 selects the stories that would be most interesting to the particular member. It is noted that the newsfeed generator 370 performs this process for each member individually, so the selection of relevant information for one member need not, and generally should not, affect the selection of relevant information (such as newsfeed stories and social ads) that are displayed to any other member.

In one embodiment, the newsfeed generator 370 computes 620 an affinity score for each of a set of candidate stories. A member may have affinities for other members, types of actions, types of objects, and content. Accordingly, the affinity score may be based on a weighted function that takes into account the set of affinities for the particular member for each type of data field that is in a candidate story. The website may obtain a member's affinities based on the member's express interests (whether provided directly or indirectly, for example, through communications with other members) and/or impliedly based on the member's actions (e.g., a member's checking of another member's page indicates an interest in that other member, or clicking on particular types of links may indicate an interest in similar links). An affinity, as measured for example by an affinity score, need not be an actual subjective interest or lack of interest that a member has for something (i.e., the member likes punk rock music, and dislikes vegetarian restaurants), but rather it may merely be a correlation between something in the candidate story and some information stored in connection with that member, whether is an action taken by the member, a communication involving the member, a characteristic, feature or expressed interest in the member's profile.

Continuing the example from above, if a member has a high affinity score for John Smith or Bob Roberts and for being invited to events, the example story would tend to have a relatively high affinity score. Once the affinity scores are computed, the newsfeed generator 370 publishes 625 the top N newsfeed stories to the web page, where N is the number of stories allocated for the web page.

Figure 9:
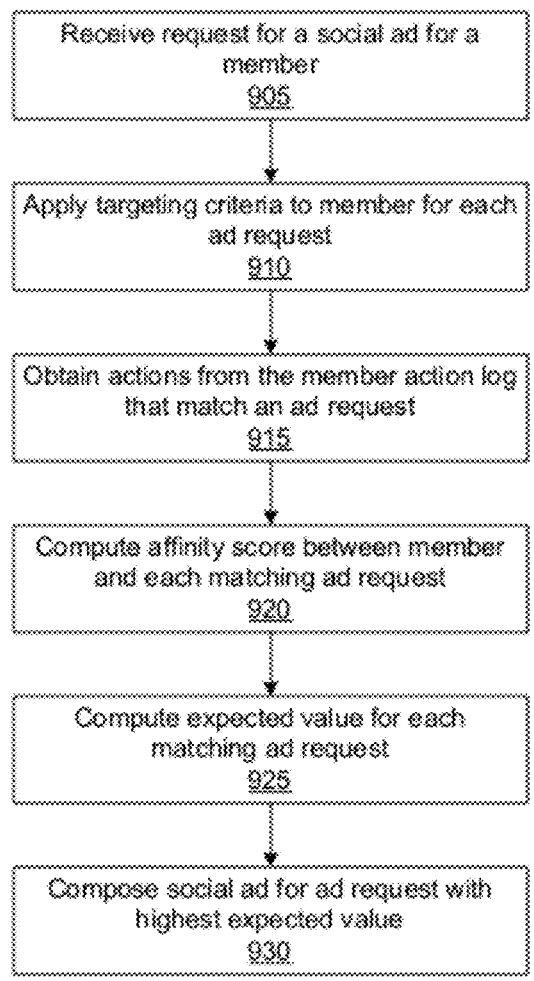
FIG. 9 is a flow chart of a process for generating newsfeed stories, in accordance with an embodiment of the invention.

FIG. 9 illustrates a process for generating social ads, which process may be performed by the ad server 380. The ad server receives 905 a request for a social ad for a particular member. In one embodiment, this request specifies the particular member by including the member's unique member identifier with the request. The ad server 380 then applies 910 the targeting criteria for each of the ad requests in the ad request database 175 to the member, if any. As described in more detail below in connection with FIG. 11, an ad request may specify a set of targeting criteria to direct the social ads to only those members who fit certain criteria. An example targeting criteria may specify any members between the ages of 18 and 30 and who have music in their interests. The ad server 380 would thus apply this targeting criteria to a particular member to determine whether to use or ignore this ad request for the member. This would then be repeated for each ad request, using the corresponding targeting criteria contained in each.

The ad server 380 then queries the action log 160 to obtain 915 action entries that match any of the ad requests whose targeting criteria were satisfied in step 910. As described in more detail below in connection with FIG. 11, an ad request may specify a type of object for which an action related to that object triggers a social ad. For example, to promote a concert for a new band, an ad request may specify an event object created for that concert. Accordingly, if one of the member's friends added the concert event to that friend's profile, the ad server 380 may obtain 915 that action from the log 160 to serve as a candidate for a social ad.

Each of the triggering actions that were obtained 915 from the log 160 for the qualifying ad requests represent a candidate social ad that may be generated by the ad server 380. To select which one or ones of the candidate social ads to generate, the ad server computes 925 an expected value for each of the candidate social ads. In one embodiment, the expected value is computed as a function of a per-click bid price for the ad weighted by an estimated probability that the social ad will be clicked by the potential recipient. To estimate the probability that a particular member will click on an ad, the ad server 380 computes this probability as a weighted function of the member's affinities for the objects in the action entry that triggered the candidate social ad and/or the member that took such action. In one embodiment, the affinity score between a member and a candidate social ad may be computed in the same way as the affinity score between a member and a newsfeed story is computed.

Once the expected values are computed for the candidate social ads, the ad server composes 930 a social ad for the candidate with the highest expected value. This social ad represents the social ad that will bring the most revenue value to the social networking website 100 due to its combination of the probability that it will be selected and the bid amount that will be paid to the website 100 if it is selected. If more than one social ad is desired, the ad server 380 may compose 930 a social ad for the desired number of candidate ads having the highest expected values.

In an alternative process, the ad server 380 may create a number of social ads in a batch process and then store the social ads in a local storage. This way, a set of social ads are ready to be provided for each member without having to be created in real time. This helps with the scalability of the social networking website 100, as real-time creation of social ads may be difficult for websites 100 with a large number of members and a resulting large number of requests for ads. Creating the social ads in a batch process also helps avoid spikes in the demand for resources. Since the creation of social ads may depend on information and preferences that change dynamically, the ad server 380 may periodically (e.g., every 15 minutes) dump the social ads and create a new batch.

FIG. 8 is a view of a portion of a web page for displaying newsfeed stories and social ads. In this example, a member is shown a list of information items about other people and/or things that the social networking website 100 predicts will be interesting to the member. The first entry 810 and the fourth entry 840 are each a newsfeed story that communicates to the member that one or more of the member's friends joined a particular group on the social networking website 100. The second entry 820 is another newsfeed story that communicates that another member posted a video to the website 100 and includes a link to watch that video.

Also contained within these newsfeed stories, in this example, is a social ad 830. This example social ad 830 communicates to the member that one of the member's friends associated their member profile with a business. (In this example, adding a link to another business profile, rather than to another member profile, is called becoming a "fan" of that business, rather than a "friend" of the other member.) This social ad 830 is an example of brand advertising, where an advertiser merely wishes to extend the recognition and value of the brand, instead of making a particular sale. In other embodiments, the social ad 830 may also contain content, such as a link to to the advertiser's own website, and/or a call to action for the advertising.

One benefit of mixing the newsfeed stories and the social ads in a single list presented to a member is that there may be little or no differentiation between advertising and general information that a member would want to know. Members visit social networking websites 100 to keep up to date on what their friends are doing, and the social ad can be as useful to the member as any other newsfeed story. Because the social ads and newsfeed stories may all be taken from the action log 160, it may be impossible for a member to determine whether an entry in the member's newsfeed is a newsfeed story or a social ad. In fact, the content of a social ad could actually show up as an organic, unpaid newsfeed story in other contexts. By paying for the social ad, the advertiser simply accelerates a newsfeed story so that it is published (or at least has a higher probability of being published) to the member's web page in a situation where it might not otherwise be selected for publication. In other embodiments, by paying for the ad the advertiser maximizes the chances the newsfeed story will be published to other members connected to the member that took the action. In some embodiments, the social ad may contain additional ad content appended to the story, so the social ads and the newsfeed stories may differ in their content.

Advertising Model

Figure 10:
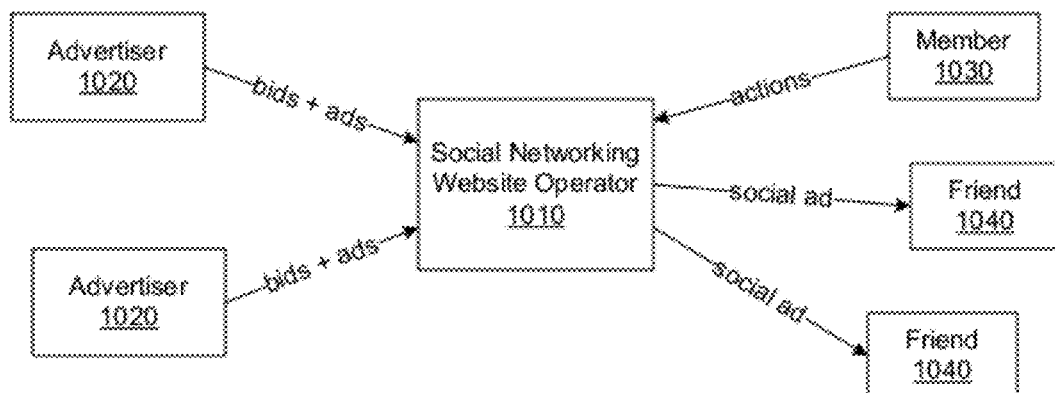
FIG. 10 is an event diagram of an advertising model, in accordance with an embodiment of the invention.

FIG. 10 illustrates an event diagram for an advertising model in accordance with one embodiment of the invention. In this advertising model, a number of advertisers 1020 bid for the placement of ads on a social networking website 100. A social networking website operator 1010 receives these bids, for example, through a web interface accessible to the advertisers 1020. Accompanying each bid is a description of the ad that the advertiser 1020 would like to publish to selected web pages on the social networking website 100. The web interface may thus allow an advertiser 1020 to specify all of the relevant information for an ad request, including the bid amount for the ad. In one embodiment, the advertisers 1020 specify ad requests, such as the one shown in FIG. 11.

Figure 11:
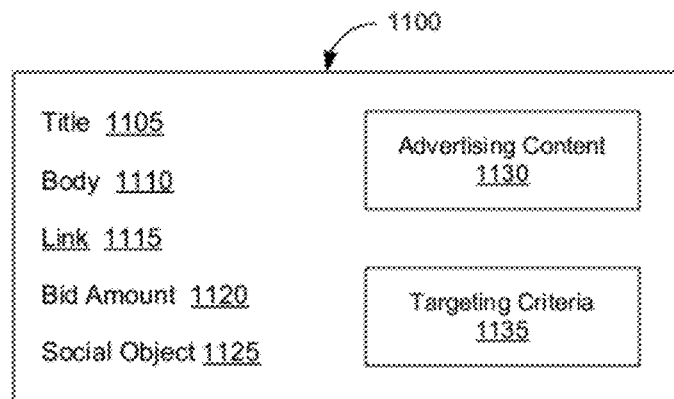
FIG. 11 is a diagram of an ad request, in accordance with an embodiment of the invention.

FIG. 11 is a diagram of some of the components of an ad request 1100, which an advertiser 1020 provides the social networking website operator 1010. The ad request 1100 may be stored by the social networking website 100 in the ad request database 175. In the example embodiment shown, the ad request 1100 comprises a title field 1105, a body field 1110, a link field 1115, a bid amount field 1120, and a social object field 1125.

The title field 1105 and body field 1110 may be used by the website to publish the social ad in a story format. For example, the social ad may include the title field 1105 as the header and then a textual story in a format as shown in FIG. 7. For example, the body field 1110 may specify: "[Member.Name] has purchased tickets for [Event.Name]." The resulting social ad would contain this text, with the names of the Member and Event objects associated with the action that the social ad is describing inserted into the text as indicated. The link field 1115 may also be added to the content of the social ad, for example, for providing the call to action of the ad. Lastly, the ad request 1100 may contain additional advertising content 1130 to be appended to the social ad. This content 1130 may include any type of media content suitable for presentation on a web page, including pictures, video, audio, hyperlinks, and any other suitable content.

The bid amount field 1120 specified in the ad request 110 may indicate an amount of money that the advertiser 1020 will pay for each time a member presented with the social ad clicks on it. Alternatively, the bid amount field 1120 may specify an amount that the advertiser 1020 will pay the website operator 1010 each time the social ad is displayed to a member or a certain number of members. The social object field 1125 specifies an object (or multiple objects) for which an action related to the object will trigger the social ad. This is described above in connection with step 915 of the process for generating a social ad, shown in FIG. 9. In addition, the ad request 1100 may allow the advertiser 1020 to specify targeting criteria 1135, the use of which is described above in connection with step 910 of the process for generating a social ad. This targeting criteria may be a filter to apply to fields of a member's member profile or other object, and/or it may include free form text.

Turning again to the event diagram of FIG. 10, the social networking website operator 1010 receives ad requests from a number of advertisers 1020. The social networking website operator 1010, via the website 100, receives a number of actions taken by a member 1030. As discussed above, these actions may be on the website 100 or on a third-party website 140, or real-world actions recorded and communicated to the social networking website operator 1010. These actions are potential triggers for one or more social ads delivered to the member's friends 1040. For example, if the member takes an action that is identified in an ad request 1100 of one of the advertisers 1020, the social networking website operator 1010 may generate a social ad based on that action and publish that social ad to a web page provided to one or more of the friends 1040. It is noted that the diagram of FIG. 10 is from the perspective of the member 1030, and the member's friends 1040 are also members of the website 100. Accordingly, actions taken by them may result in social ads delivered to their friends (which includes the member 1030). In addition, a member's actions, either alone or combined with other member's actions, may result in social ads delivered to members who have some other relationship to that member, such as other members who belong to same network or group as the member.

Social Ads Based on Actions on Third-Party Websites

Figure 12:
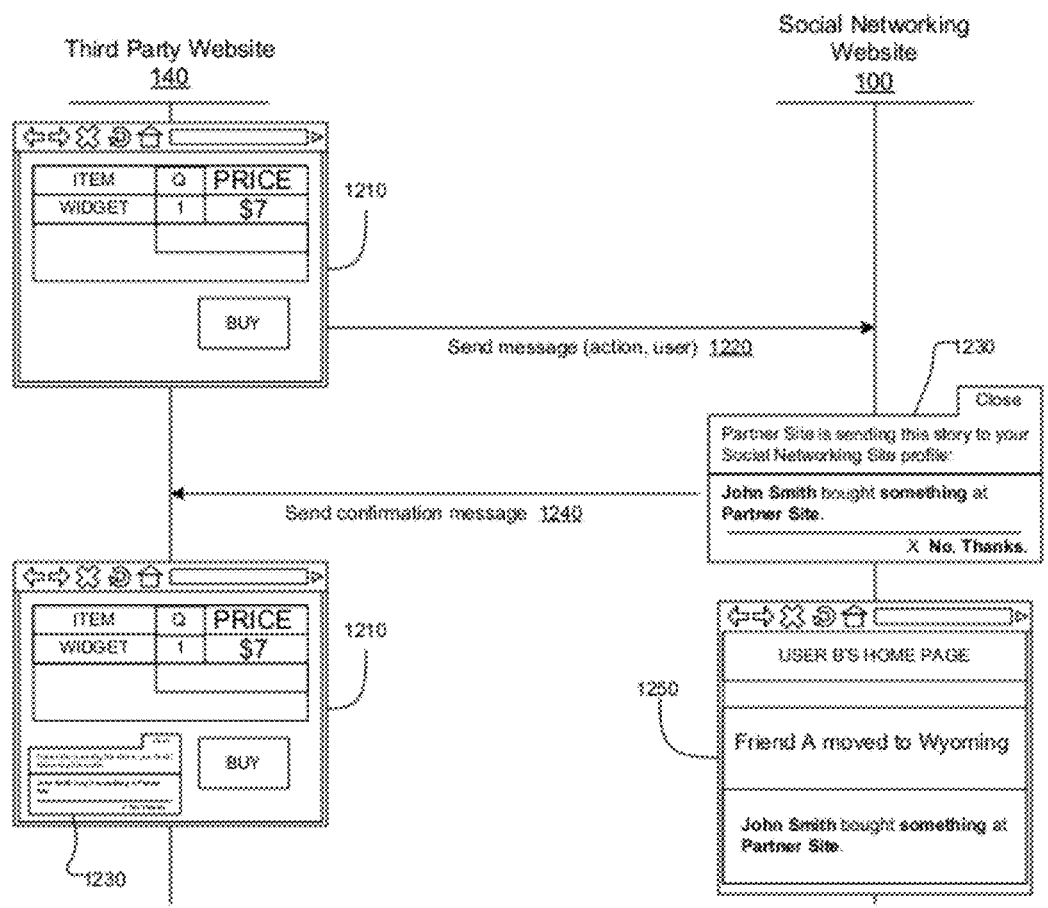
FIG. 12 illustrates a process in which actions from a third party website are communicated to and used by a social networking website to generate social ads, in accordance with an embodiment of the invention.

FIG. 12 illustrates a process in which actions from third party websites 140 are communicated to and used by a social networking web site 100 to generate social ads, as described above. In the example shown, a user makes a purchase on a third party website 140 hosted on a different domain than the social networking website 100. The fact of this purchase is then communicated to the social networking website 100, which uses the information to publish social ads to one or more friends of the user. Although described in the context of a purchase on the third party website 140, the technique is not limited to purchases. Any other user actions on a third party website 140 may be communicated to the social networking website 100 for use thereby, including registering for an account, viewing an item, saving an item to an account, renting an item, making a reservation, subscribing to an information resource, or any other action that the operator of the third party website decides to select for such tracking. More specific examples of other types of actions in other domains that may be useful for generating social ads on the social networking website 100 include purchasing an article of clothing, subscribing to a blog, storing an item in a wish list, purchasing tickets to a concert, registering for a marathon, making a flight or restaurant reservation, and donating to a charity.

In the example of FIG. 12, a user operates a client application, such as a web browser, to view a web page at the online store hosted by a third party website 140. The user decides to purchase an item, for example a widget. The user will typically be presented with a purchase page 1210 on which the user can confirm the purchase, for example by clicking on a "Buy" button. The third party website 140 generates a message that identifies the third party website 140 and describes the type of action (e.g., indicating whether the action is a purchase, a rating, a request for information, a subscription, or the like, as well as any other information needed to describe the action, such as the item that was purchased). In this example, the message would identify the action as a purchase and would describe the item that was purchased. The third party website 140 then transmits 1220 this message to the social networking website 100.

In one embodiment, the third party website 140 and/or the social networking website 100 determine whether the user is a member of the social networking website 100. For example, the third party website 140 may access a cookie on the user's computer, where the cookie is associated with the social networking website 100. Since the social networking website 100 and the third party website 140 are on different domains, the user's browser program may include security features that normally prevent a website from one domain from accessing content on other domains. To avoid this, the third party website 140 may use nested iframes, where the third party website 140 serves a web page that includes a nested iframe in the social network website's domain, thereby allowing the nested iframe to access the user information and send the information back to the third party website 140. Repeated nesting of iframes further allows the social networking site 100 to communicate information back to the third party website 140. By using this technique, the third party website 140 and the social networking website 100 can communicate about the user without sharing any of the user's personal information and without requiring the user to log into the social networking website 100.

After the social networking website 100 receives the message communicating the action information from the third party website 140, it generates a confirmation message 1230 to be displayed to the user on the third party website 140. For example, the confirmation message may provide a sample of the story that could be published to the user's friends based on the user's actions on the third party website 140. In this example, the message is: "John Smith bought <something> at <Partner Site>" (where the user would be "John Smith,"<something> would be replaced by the name of item purchased, and <Partner Site> would be replaced by the name and a link to the third party website 140). The confirmation message 1230 is passed 1240 back to the third party website, where it is displayed in the web page 1210 on the domain of the third party website 140.

On this web page 1210, this confirmation message 1230 informs the user of the story that the user's friends may be provided via the social networking website 100. The confirmation message 1230 may also allow the user to opt out of the feature to prevent the message from being shown to others. In other embodiments, the user can opt-in or opt-out of allowing to be published stories, or particular types of stories, generated from actions taken by particular third party websites (or groups of third party websites) in advance of the user taking such actions.

At some later point in time, the social networking website 100 may communicate the story about the user's purchase to other members who have a connection to the user on the social networking website 100. This communication may be in the form of a series of stories published on another user's home page 1250 on the social networking website 100, in accordance with the embodiments described above.

In this way, the social networking website 100 can communicate a user's actions on other third party websites 140 to the user's friends on the social networking website 230. Beneficially, communicating a user action on a third party website 140 to the user's connections on a social networking website 100 may motivate these other users to perform a similar action. For example, notifying a member's friends that a member has purchased a specific movie may prompt the friends to purchase the movie as well, or at least generate some interest in that movie. Moreover, this technique may be used in combination with the advertising model and ad requests described above, or it may be performed by the social networking website independently of any advertising model.

Social Ads and Messages Presented on a Third Party Website

As described above, actions by users performed off of a social networking website (e.g., actions on third party websites or in the real world) may be used to generate social ads on the social networking website. Conversely, in various embodiments of the invention, a social networking website can collect its users' actions and then present social ads and/or other information concerning actions taken by its users on third party websites. In this way, the techniques for promoting actions using this information can be extended beyond a social networking website itself.

Embodiments of the invention may use any of the mechanisms described above for collecting user actions and generating social ads therefrom. For example, a social networking website may log a number of actions about a user's connections on a particular third party website, such as the purchase of a particular item. When the user visits the third party website and views a web page associated with that item, the third party website may communicate with the social networking website to determine that the user's connections have also purchased this item. Mechanisms for communicating information about a user between a third party website and a social networking website are described above.

Once the third party web site receives this information, it can present the information to the user. For example, when viewing the page for a movie that is on sale via the third party website, the third party website may present a message to the user that a certain number of the user's connections from the social networking website have rated the movie positively. For example, the message might read: "Ten of your friends have liked this movie." The user is thus encouraged to purchase the movie on the third party website because the user's friends from the social networking website like the movie.

Accordingly, social ads or other information concerning actions taken by a user's friends may be presented to users off the social networking website, just as on the website as described above. Used in this way, the information can help encourage a user to take an action (such as a purchase) at the point the user is deciding to act. The information need not be in response to an advertising effort in which one of the websites is being compensated, as this exposure may have a synergistic effect for both the social networking website and the third party website.

This technique can be used in a variety of other contexts. For example, the technique can be used to communicate a user's interest in particular items or content on third party websites. The user can be provided with information by the third party website that is related to content offered by the third party website, but where that information is gathered by the social networking website. The third party websites may thus leverage the information gathered by the social networking website, including the inherent value of the information being about third parties to whom the user has some connection.

The user's experience can be integrated between the third party website and the social networking website such that the information is used in both domains. For example, a user's movie preferences can be accessed by the user's friends on a social networking website, while the user can also view the user's friends' movie ratings on a third party website where the user buys or rents movies. In addition, third party websites may provide content from the social networking website, such as newsfeeds or series of stories about a user's friends that the user would normally be presented with on the social networking website. These are just a few examples of applications for the cross-domain use of socially relevant information, some but not all of which involve advertising.

In one embodiment, the user interface on the third party website provides a bidirectional interface in which user interface elements from the social networking website domain and the third party website domain affect the presentation of user interface elements of the other. For example, if content from a social networking website is presented in a frame (e.g., an iframe) on a web page of the third party website, actions that a user takes on the frame may affect how information in the web page is presented. These actions may be as simple as a resizing event of the frame, or more complicated such as a mouse-over of an item in the social networking frame causing a corresponding item in the third party domain part of the web page being enhanced.

In one particular example, a frame from a social networking website may present a list of a user's friends. If the user clicks on a particular friend, the social networking website may communicate to the third party website a list of items that the friend has purchased (without disclosing to the website any information, including the identity, of those friends). The third party website may then highlight these items on its own web page, thereby providing the user with an easy interface for locating items on the website to purchase based on the user's friends' purchase histories.

Alternative Applications

Embodiments of the invention have been described in the context of social networking websites. However, the techniques described herein may be applied to a number of other types of websites that are not necessarily concerned with social networking. Such websites include any website that tracks any kind of information about users of the website and then provides that information to other users. For example, a retail website may keep track of users who make purchases from the website, then communicating the information about some of its users to other users using the techniques described herein.

In this sense, the connections between users of a website need not be formal or express connections, as is common in the social networking context. Instead, the connections may be implied or otherwise assumed due to common characteristics, traits, or user actions. For example, if the website keeps track of personal information about its users, it may communicate information to a particular user about the actions of other users with something in common. For example, a website might tell a user who graduated from a University: "There are 26 other graduates from University who have bought this book on this website." In another example, a web blog dedicated to electronic gadgets may tell a person who comments on a particular topic in the blog: "Four people who have commented on this topic own the product. Click on the link below to purchase it, too."

In another context, the techniques described herein may be used with search engines. For example, users who search for a particular item on a search engine are more likely to be interested in items that their friends or other connections have bought. If the search engine keeps track of users' connections, the search engine can inform a user of the user's connections' actions in addition to providing the user with search results. If the search engine keeps other information concerning a user, such as biographic, demographic, and other types of descriptive information, including interests, the search engine can inform the user of actions taken by third parties who have provided some of the same or similar information. The search engine may also change the order of the search results presented to the user based on the user's connections' actions, or actions of third parties who have provided the same or similar information.

In another embodiment, the social ads and other informational messages described herein may be presented outside of the social networking website. For example, information about actions taken by members of the social network may be received and logged by the social networking website, and social ads and/or other informational messages may be generated based on these actions. These informational message can be communicated from the social networking website to another domain, such as a different website, and presented to one or more members of the social network. As described herein, messages about a particular member would be presented to others members with whom the member has a connection in the social network. In this way, the benefits of the social ads and other informational messages described herein can be achieved even outside the social networking website.

SUMMARY

The foregoing description of the embodiments of the invention has been presented for the purpose of illustration;

it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network website, it will apparent to one of ordinary skill in the art that the invention may be used with any electronic social network service, even if it is not provided through a website. Any computer-based system that provides social networking functionality can be used in accordance with the present invention even if it relies, for example, on e-mail, instant messaging, or other form of electronic communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
logging, by a social networking computer system, information related to actions performed by users of a social networking system;
receiving, by the social networking computer system, an advertisement request from an advertiser to sponsor stories for display in user interfaces for viewing users, each of the sponsored stories comprising:
a message to a viewing user of the social networking system that includes information related to an action performed by one or more users with whom the viewing user is connected in the social networking system,
wherein the action is selectable by the advertiser from a plurality of actions provided to the advertiser by the social networking computer system;
for each of the viewing users:
selecting, by the social networking computer system, information about one or more actions performed by other users with whom the viewing user is connected in the social networking system to identify candidate information to include in stories for display to the viewing user in a newsfeed;
identifying, from the candidate information, matches with an action of the advertisement request;
generating, by a computer processor of the social networking computer system, a plurality of news stories based on the selected candidate information and a plurality of sponsored stories based on the selected candidate information that was identified as a match with an action of the advertisement request;
generating, by the social networking computer system, a feed that comprises:
the generated sponsored stories; and
the generated plurality of news stories,
wherein the feed includes a combination of generated news stories and generated sponsored stories that are personalized to the viewing user; and
providing, for display by the social networking computer system, user interfaces including each of the generated feeds for each of the viewing users such that the feeds are different for different viewing users, wherein some of the stories that are sponsored stories in one feed appear as non-sponsored news stories in other feeds.

2. The method of claim 1, wherein the generated sponsored stories that are personalized to the viewing user includes information about a purchase an item by the other users with whom the viewing user is connected in the social networking system.

3. The method of claim 1, wherein the generated sponsored stories that are includes to the viewing user includes information about a location of the other users with whom the viewing user is connected in the social networking system.

4. The method of claim 1, wherein the generated sponsored stories that are personalized to the viewing user includes information about program material on a television system accessed by the other users with whom the viewing user is connected in the social networking system.

5. The method of claim 1, wherein selecting information about one or more actions by other users within whom the viewing user is connected in the social networking system to identify candidate information comprises selecting based on affinity of the viewing user for the candidate information.

6. The method of claim 5, wherein selecting based on affinity comprises:
determining an affinity score between the viewing user and each of the candidate information; and
selecting the candidate information having the highest affinity score.

7. The method of claim 1, wherein selecting information about one or more actions by other users within whom the viewing user is connected in the social networking system to identify candidate information comprises selecting based on an expected value for each of the candidate information.

8. The method of claim 7, wherein the candidate information with a highest expected value is selected.

9. The method of claim 7, further comprising receiving a bid amount from an advertiser to sponsor a story, wherein the expected value is computed as a function of a per-click bid price for the sponsored story including the candidate information weighted by an estimated probability that the sponsored story will be clicked by the viewing user.

10. The method of claim 9, wherein the estimated probability is computed as a weighted function of an affinity score of the viewing user for the other users with whom the viewing user is connected or for content in the sponsored story.

11. The method of claim 1, wherein the request from an advertiser to sponsor stories for display in user interfaces for viewing users comprises a price associated with the request indicating an amount that the advertiser is willing to pay to sponsor stories for display in the user interfaces for the viewing users.

12. The method of claim 1, wherein logging information related to actions performed by users of a social networking system comprises logging information received from an external site related to actions performed by users of a social networking system on the external site.

13. The method of claim 1, wherein the generated plurality of news stories comprise information about actions taken by the other users with whom the viewing user is connected, the actions contained in an action log.

14. The method of claim 1, further comprising selecting a subset of the plurality of new stories generated for inclusion in the feed, the subset selected based on affinity of the viewing user for the other users associated with each of the news stories, for a type of action included in each of the news stories, or for a type of object included in each of the news stories.

15. A computer-implemented system comprising:
a processor;
an action logger for logging information, by a social networking computer system, related to actions performed by users of a social networking system;
an advertisement request database for storing, by the social networking computer system, a plurality of advertisement requests from advertisers for sponsored stories;
an advertising server configured for:
receiving, by the social networking computer system, an advertisement request from an advertiser to sponsor stories for display in user interfaces for viewing users, each of the sponsored stories comprising:
a message provided to a viewing user of the social networking system including information related to an action performed by one or more users with whom the viewing user is connected in the social networking system,
wherein the action is selectable by the advertiser from a plurality of actions provided to the advertiser by the social networking computer system;
for each of the viewing users:
selecting, by the social networking computer system, information about one or more actions performed by other users with whom the viewing user is connected in the social networking system to identify candidate information to include in stories for display to the viewing user in a newsfeed based on one or more criteria;
a feed generator configured for:
for each of the viewing users:
identifying, from the candidate information, matches with an action of the advertisement request;
generating, by a computer processor of the social networking computer system, a plurality of news stories based on the selected candidate information and a plurality of sponsored stories based on the selected candidate information that was identified as a match with an action of the advertisement request;
generating, by the social networking computer system, a feed that comprises:
the generated sponsored stories; and
the generated plurality of news stories,
wherein the feed includes a combination of generated news stories and generated sponsored stories that are personalized to the viewing user; and
a web server configured for providing, for display by the social networking computer system, user interfaces including each of the generated feeds for each of the viewing users such that the feeds are different for different viewing users, wherein some of the stories that are sponsored stories in one feed appear as non-sponsored news stories in other feeds.

16. The system of claim 15, wherein the generated sponsored stories that are personalized to the viewing user includes information about a purchase of an item by the other users with whom the viewing user is connected in the social networking system, a location of the other users, or program material on a television system accessed by the other users.

17. The system of claim 15, wherein the one or more criteria comprise affinity of the viewing user for the candidate information or an expected value of the candidate information.

18. The system of claim 17, wherein the advertising server is configured for determining the affinity based on one or more express interests of the viewing user provided directly or indirectly by the viewing user on the social networking system or based on one or more implied interests of the viewing user determined through actions taken by the viewing user on the social networking system.

19. The system of claim 15, wherein the advertising server is configured for receiving a bid amount from an advertiser to sponsor a story, wherein the bid amount by the advertiser accelerates the sponsored story or maximizes a chance that the sponsored story will be provided to the viewing user.

20. The system of claim 15, further comprising an action log for storing the information related to actions performed by users of a social networking system, wherein one or more of the logged actions are included in the generated sponsored story or the news stories.

21. The system of claim 15, wherein the feed generator is configured for selecting news stories for the feed from the plurality of news stories based on an affinity of the viewing user for each of the plurality of news stories.

22. The system of claim 15, wherein the action of the advertisement request comprises an action taken external to the social networking system.

23. A non-transitory computer-readable storage medium storing executable computer program instructions comprising instructions for performing the steps comprising:
- logging, by a social networking computer system, information related to actions performed by users of a social networking system;
- receiving, by the social networking computer system, an advertisement request from an advertiser to sponsor stories for display in user interfaces for viewing users, each of the sponsored stories comprising:
  - a message to a viewing user of the social networking system that includes information related to an action performed by one or more users with whom the viewing user is connected in the social networking system,
  - wherein the action is selectable by the advertiser from a plurality of actions provided to the advertiser by the social networking computer system;
- for each of the viewing users:
  - selecting, by the social networking computer system, information about one or more actions performed by other users with whom the viewing user is connected in the social networking system to identify candidate information to include in stories for display to the viewing user in a newsfeed;
  - identifying from the candidate information matches with an action of the advertisement request;
  - generating, by a computer processor of the social networking computer system, a plurality of news stories based on the selected candidate information and a plurality of sponsored stories based on the selected candidate information that was identified as a match with an action of the advertisement request;
  - generating, by the social networking computer system, a feed that comprises:
    - the generated sponsored stories; and
    - the generated plurality of news stories,
    - wherein the feed includes a combination of generated news stories and generated sponsored stories that are personalized to the viewing user; and
- providing, for display by the social networking computer system, user interfaces including each of the generated feeds for each of the viewing users such that the feeds are different for different viewing users, wherein some of the stories that are sponsored stories in one feed appear as non-sponsored news stories in other feeds.

24. The computer-readable storage medium of claim 23, wherein the generated sponsored stories that are personalized to the viewing user includes information about a purchase of an item by the other users with whom the viewing user is connected in the social networking system, a location of the other users, or program material on a television system accessed by the other users.

25. The computer-readable storage medium of claim 23, wherein the one or more criteria comprise affinity of the viewing user for the candidate information or an expected value of the candidate information.

26. The computer-readable storage medium of claim 23, further comprising:
- receiving a request for a set of news stories for a viewing user; and
- obtaining a listing of any actions contained in an action log that are related to the viewing user, the actions being related if they relate to another user to whom the viewing user has a connection or an object to which the viewing user is connected.

* * * * *

UNITED STATES PATENT AND TRADEMARK OFFICE
CERTIFICATE OF CORRECTION

PATENT NO. : 10,068,258 B2
APPLICATION NO. : 13/447102
DATED : September 4, 2018
INVENTOR(S) : Timothy Kendall et al.

Page 1 of 1

It is certified that error appears in the above-identified patent and that said Letters Patent is hereby corrected as shown below:

In the Claims

Column 20, Claim 3, Line 56, delete "includes" and insert --personalized--

Column 23, Claim 23, Line 29, after "identifying", insert --,--

Column 23, Claim 23, Line 29, after "information", insert --,--

Signed and Sealed this
Eighteenth Day of June, 2019

Andrei Iancu
*Director of the United States Patent and Trademark Office*